United States Patent
Woo et al.

(10) Patent No.: US 11,538,443 B2
(45) Date of Patent: Dec. 27, 2022

(54) ELECTRONIC DEVICE FOR PROVIDING AUGMENTED REALITY USER INTERFACE AND OPERATING METHOD THEREOF

(71) Applicant: SAMSUNG ELECTRONICS CO., LTD., Suwon-si (KR)

(72) Inventors: Youngchan Woo, Suwon-si (KR); Jooyoon Bae, Suwon-si (KR); Miyoung Lee, Suwon-si (KR); Gulji Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 16/785,951

(22) Filed: Feb. 10, 2020

(65) Prior Publication Data

US 2020/0258481 A1    Aug. 13, 2020

(30) Foreign Application Priority Data

Feb. 11, 2019 (KR) .......................... 10-2019-0015624

(51) Int. Cl.
*G09G 5/38* (2006.01)
*G06F 3/01* (2006.01)
(Continued)

(52) U.S. Cl.
CPC ............... *G09G 5/38* (2013.01); *G06F 3/012* (2013.01); *G06F 3/013* (2013.01); *G06F 3/017* (2013.01);
(Continued)

(58) Field of Classification Search
CPC ........ G09G 5/38; G09G 5/14; G09G 2354/00; G09G 2340/0464; G06F 3/013;
(Continued)

(56) References Cited

U.S. PATENT DOCUMENTS

| | | | |
|---|---|---|---|
| 6,771,294 B1 * | 8/2004 | Pulli | G06F 3/011 |
| | | | 715/764 |
| 8,467,133 B2 * | 6/2013 | Miller | G06Q 30/02 |
| | | | 359/13 |

(Continued)

FOREIGN PATENT DOCUMENTS

| | | |
|---|---|---|
| KR | 10-2011-0038425 | 4/2011 |
| KR | 10-2015-0037254 | 4/2015 |
| WO | WO 2018/201150 A1 | 11/2018 |

OTHER PUBLICATIONS

International Search Report and Written Opinion dated May 25, 2020 issued in International Application No. PCT/KR2020/001762.

(Continued)

*Primary Examiner* — Benyam Ketema
(74) *Attorney, Agent, or Firm* — Nixon & Vanderhye P.C.

(57) ABSTRACT

Various embodiments of the disclosure relate to an electronic device for providing a user interface for changing a display mode related to displaying of a virtual reality object, and an operating method thereof. An electronic device according to various embodiments of the disclosure may include a display, a processor operatively coupled to the display, a memory operatively coupled to the processor. The memory may store instructions which, when executed, cause the processor to control the electronic device to: display at least one virtual object in a first display mode in which the at least one virtual object is displayed at a fixed position of the screen irrespective of a Point Of View (POV) of the user by superimposing the at least one virtual object on a real object image corresponding to at least one real object, receive a first input for changing the display mode of the at least one virtual object, and display the at least one virtual object in a second display mode in which a screen display position changes depending on the POV of the user in response to receiving the first input.

19 Claims, 30 Drawing Sheets

(51) Int. Cl.
*G06F 3/16* (2006.01)
*G09G 5/14* (2006.01)
*G06T 11/00* (2006.01)

(52) U.S. Cl.
CPC .............. *G06F 3/167* (2013.01); *G06T 11/00* (2013.01); *G09G 5/14* (2013.01); *G06T 2200/24* (2013.01); *G09G 2354/00* (2013.01)

(58) Field of Classification Search
CPC .......... G06F 3/017; G06F 3/167; G06F 3/012; G06F 3/011; G06F 3/147; G06T 11/00; G06T 2200/24; G02B 27/0093; G02B 2027/0187; G02B 27/017
See application file for complete search history.

(56) References Cited

U.S. PATENT DOCUMENTS

| | | | |
|---|---|---|---|
| 9,047,698 B2* | 6/2015 | Maciocci | G06F 3/167 |
| 9,069,164 B2* | 6/2015 | Starner | G02B 27/017 |
| 9,141,188 B2* | 9/2015 | Fein | G06T 19/006 |
| 9,245,388 B2* | 1/2016 | Poulos | G06T 19/006 |
| 9,256,283 B2* | 2/2016 | Kang | G02B 27/017 |
| 9,272,132 B2* | 3/2016 | Laufer | A61N 1/3601 |
| 9,384,594 B2 | 7/2016 | Maciocci et al. | |
| 9,619,911 B2* | 4/2017 | Pandey | G06F 3/012 |
| 9,726,896 B2* | 8/2017 | von und zu Liechtenstein | H04N 13/00 |
| 9,727,132 B2* | 8/2017 | Liu | G06F 3/012 |
| 9,766,463 B2* | 9/2017 | Border | G02B 27/0093 |
| 10,101,802 B2* | 10/2018 | Abovitz | G06F 3/016 |
| 10,469,833 B2* | 11/2019 | Hua | G02B 27/0172 |
| 10,854,012 B1* | 12/2020 | Iyer | G02B 27/0093 |
| 11,025,892 B1* | 6/2021 | Aman | H04N 21/458 |
| 2003/0020707 A1* | 1/2003 | Kangas | G06F 3/011 345/418 |
| 2003/0030597 A1* | 2/2003 | Geist | G02B 27/0172 345/8 |
| 2005/0078378 A1* | 4/2005 | Geist | G02B 27/0172 359/630 |
| 2006/0061544 A1* | 3/2006 | Min | G06F 3/015 345/7 |
| 2011/0205242 A1* | 8/2011 | Friesen | G06T 11/001 345/633 |
| 2012/0050143 A1* | 3/2012 | Border | G02B 27/0172 345/8 |
| 2012/0249741 A1* | 10/2012 | Maciocci | G06T 19/006 348/51 |
| 2012/0302289 A1* | 11/2012 | Kang | G06F 3/016 455/557 |
| 2013/0147686 A1* | 6/2013 | Clavin | G02B 27/017 345/8 |
| 2014/0078176 A1* | 3/2014 | Kim | G06F 3/011 345/633 |
| 2014/0132484 A1* | 5/2014 | Pandey | G02B 27/017 345/8 |
| 2014/0132629 A1* | 5/2014 | Pandey | G02B 27/017 345/633 |
| 2014/0160250 A1* | 6/2014 | Pomerantz | H04N 5/23218 348/222.1 |
| 2014/0204002 A1* | 7/2014 | Bennet | G06T 19/006 345/7 |
| 2014/0237366 A1* | 8/2014 | Poulos | G06F 3/013 715/728 |
| 2014/0240226 A1* | 8/2014 | Faenger | G02B 27/017 345/156 |
| 2014/0282220 A1* | 9/2014 | Wantland | G06F 3/011 715/782 |
| 2014/0292645 A1* | 10/2014 | Tsurumi | G06T 19/20 345/156 |
| 2014/0368532 A1 | 12/2014 | Keane et al. | |
| 2015/0061973 A1* | 3/2015 | Park | G06F 3/00 345/8 |
| 2015/0062158 A1* | 3/2015 | Hildreth | G02B 27/017 345/633 |
| 2015/0062164 A1* | 3/2015 | Kobayashi | G06T 11/60 345/633 |
| 2015/0091943 A1 | 4/2015 | Lee et al. | |
| 2015/0199848 A1* | 7/2015 | Kim | G06T 11/00 345/633 |
| 2015/0234456 A1* | 8/2015 | Cho | G02B 27/0172 345/156 |
| 2015/0317831 A1* | 11/2015 | Ebstyne | G02B 27/017 345/419 |
| 2015/0339468 A1* | 11/2015 | Son | G06F 3/013 726/19 |
| 2016/0044298 A1 | 2/2016 | Holz et al. | |
| 2016/0370970 A1 | 12/2016 | Chu et al. | |
| 2017/0011557 A1 | 1/2017 | Lee et al. | |
| 2017/0139474 A1* | 5/2017 | Rochford | G06F 3/017 |
| 2017/0178356 A1* | 6/2017 | Bhuruth | G06T 13/00 |
| 2017/0206668 A1 | 7/2017 | Poulos et al. | |
| 2017/0206691 A1* | 7/2017 | Harrises | G06T 11/60 |
| 2018/0039083 A1* | 2/2018 | Miller | G02B 27/0093 |
| 2019/0004683 A1* | 1/2019 | Pahud | G06T 19/006 |
| 2019/0011978 A1 | 1/2019 | Ravindran et al. | |
| 2019/0114075 A1* | 4/2019 | Jung | G06F 3/04842 |
| 2019/0377482 A1* | 12/2019 | Shin | H04W 4/026 |
| 2020/0097065 A1* | 3/2020 | Iyer | G06F 3/017 |
| 2020/0117898 A1* | 4/2020 | Tian | G06F 3/04815 |
| 2021/0021748 A1* | 1/2021 | Cutler | H04N 5/208 |
| 2021/0094180 A1* | 4/2021 | Szafir | G06V 20/10 |
| 2021/0133449 A1* | 5/2021 | Paullus | G06V 20/20 |
| 2021/0272367 A1* | 9/2021 | Richter | G06T 15/20 |

OTHER PUBLICATIONS

Extended European Search Report dated Dec. 15, 2021 for EP Application No. 20755142.5.

India Office Action dated Mar. 1, 2022 for IN Application No. 202117040014.

* cited by examiner

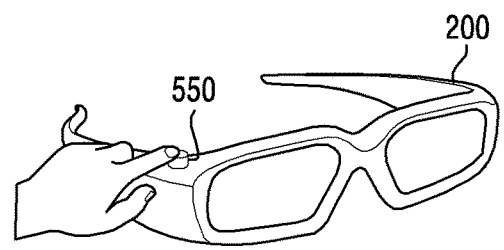
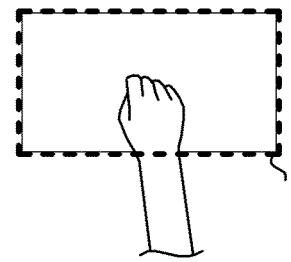
FIG.8A  FIG.8B
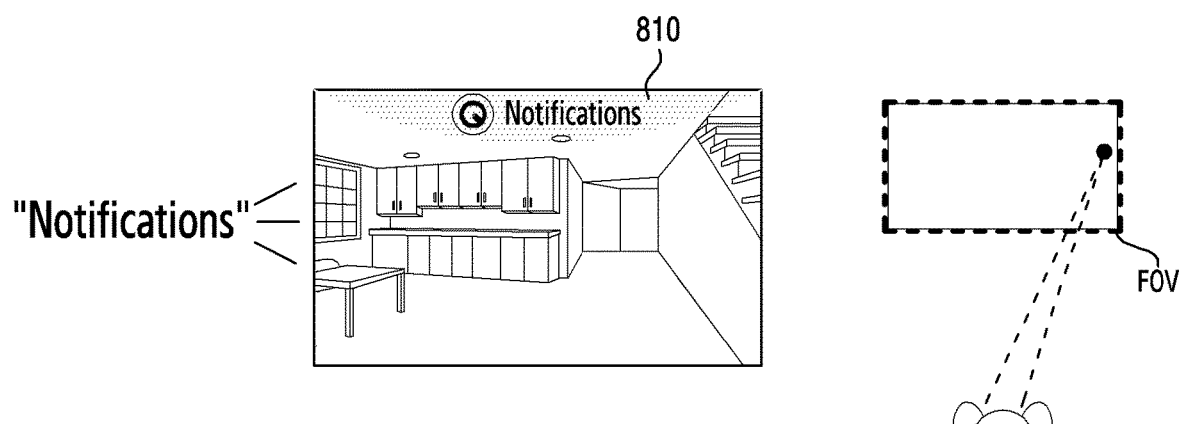
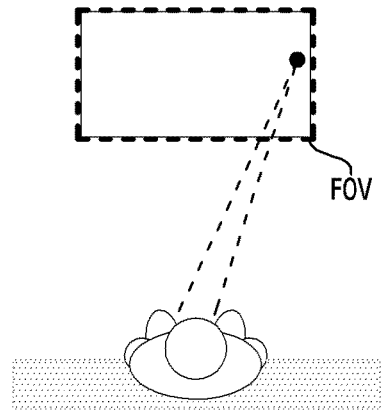
FIG.8C  FIG.8D

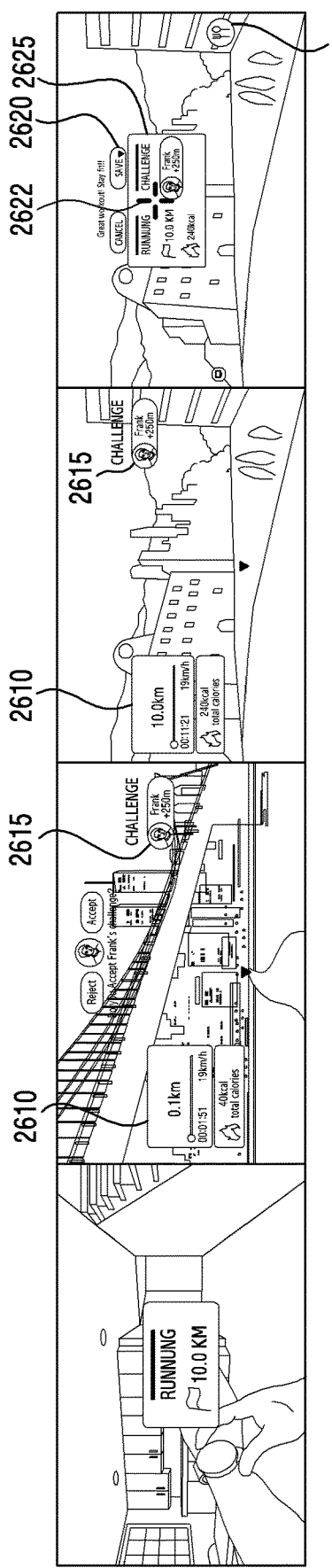
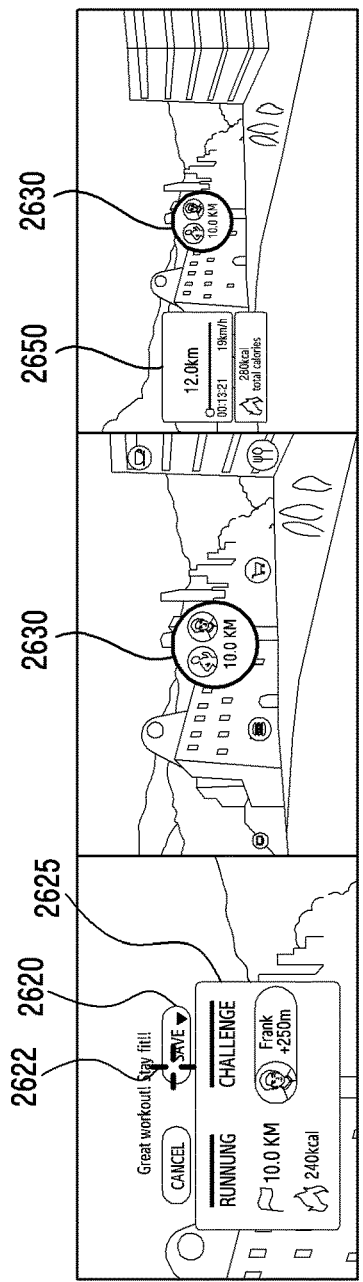
FIG.26A  FIG.26B  FIG.26C  FIG.26D
FIG.26E  FIG.26F  FIG.26G

ELECTRONIC DEVICE FOR PROVIDING AUGMENTED REALITY USER INTERFACE AND OPERATING METHOD THEREOF

CROSS REFERENCE TO RELATED APPLICATION

This application is based on and claims priority under 35 U.S.C. § 119 to Korean Patent Application No. 10-2019-0015624, filed on Feb. 11, 2019, in the Korean Intellectual Property Office, the disclosure of which is incorporated by reference herein in its entirety.

BACKGROUND

Field

The disclosure relates to an electronic device for providing a user interface for changing a display mode related to displaying of a virtual real object, and an operating method thereof.

Description of Related Art

A portable electronic device such as a smartphone provides a user with not only a basic service such as phone calls, texting, or the like but also various types of services such as a financial service (e.g., purchasing of goods), an entertainment service (e.g., games), or the like in various manners such as a Virtual Reality (VR) scheme, an Augmented Reality (AR) scheme, or the like.

In addition, with the growing development of wearable techniques, a Head Mounted Display (HMD)-type electronic device is gradually becoming popular. A wearable device such as an HMD-type device uses the aforementioned VR and AR scheme to provide a user with an amazing experience that cannot be easily encountered in reality.

A user who uses a device (e.g., an HMD device) capable of displaying a virtual object image on a screen may be provided with a virtual object displayed by being superimposed on an image (hereinafter, a real object image) corresponding to a real object (e.g., a building signboard, a road, a street tree).

When the electronic device provides the virtual object, the electronic device may display the virtual object image at a fixed position of the screen. For example, if the user wears the HMD device and rides a bicycle, the user may be provided with a virtual object indicating a current movement speed, a cumulative distance so far, or the like by being superimposed on a real object image. However, in this case, since virtual object images displayed on a screen are displayed at fixed positions on the screen irrespective of a user's head movement, the user may experience inconvenience when interacting with virtual objects provided on the screen since an inconvenient and complicated manipulation is required rather than a simple manipulation (e.g., a head movement).

In addition, when the electronic device provides the virtual object, the electronic device may display the virtual object image at a variable position of the screen. In this case, however, positions of the virtual object images displayed on the screen change depending on a change of a user's Point of View (POV) or viewing area. Therefore, there are many cases where the positions, at which the virtual object images are displayed, change unintentionally, which may make it difficult to continuously identify information.

Accordingly, a method is required in which a display mode for displaying a virtual object image is switched based on a user's input to provide a virtual object in the switched display mode.

SUMMARY

Embodiments of the disclosure provide an electronic device capable of switching a display mode for displaying a virtual object image based on various types of a user's input and capable of providing a virtual object in the switched display mode, and an operating method thereof.

An electronic device according to various example embodiments of the disclosure may include a display, a processor operatively coupled to the display, a memory operatively coupled to the processor. The memory may store instructions that, when executed, cause the processor to control the electronic device to: display at least one virtual object in a first display mode in which the at least one virtual object is displayed at a fixed position of a screen irrespective of a Point Of View (POV) of the user by superimposing the at least one virtual object on a real object image corresponding to at least one real object, receive a first input for changing the display mode of the at least one virtual object, and display the at least one virtual object in a second display mode in which a screen display position changes depending on the POV of the user in response to receiving the first input.

A method of operating an electronic device according to various example embodiments of the disclosure may include displaying at least one virtual object in a first display mode in which the at least one virtual object is displayed at a fixed position of a screen irrespective of a POV of the user by superimposing the at least one virtual object on a real object image corresponding to at least one real object, receiving a first input for changing the display mode of the at least one virtual object, and displaying the at least one virtual object in a second display mode in which a screen display position changes depending on the POV of the user in response to receiving the first input.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 8A, 8B, 8C and 8D are diagrams illustrating examples of a first user input for changing a display mode according to various embodiments of the disclosure;

FIGS. 26A, 26B, 26C, 26D, 26E, 26F and 26G are diagrams illustrating an example operation of an electronic device for combining data related to a virtual object previously displayed in a first display mode and storing the data by converting it in a form suitable for a space according to various embodiments of the disclosure;

DETAILED DESCRIPTION

Figure 1:
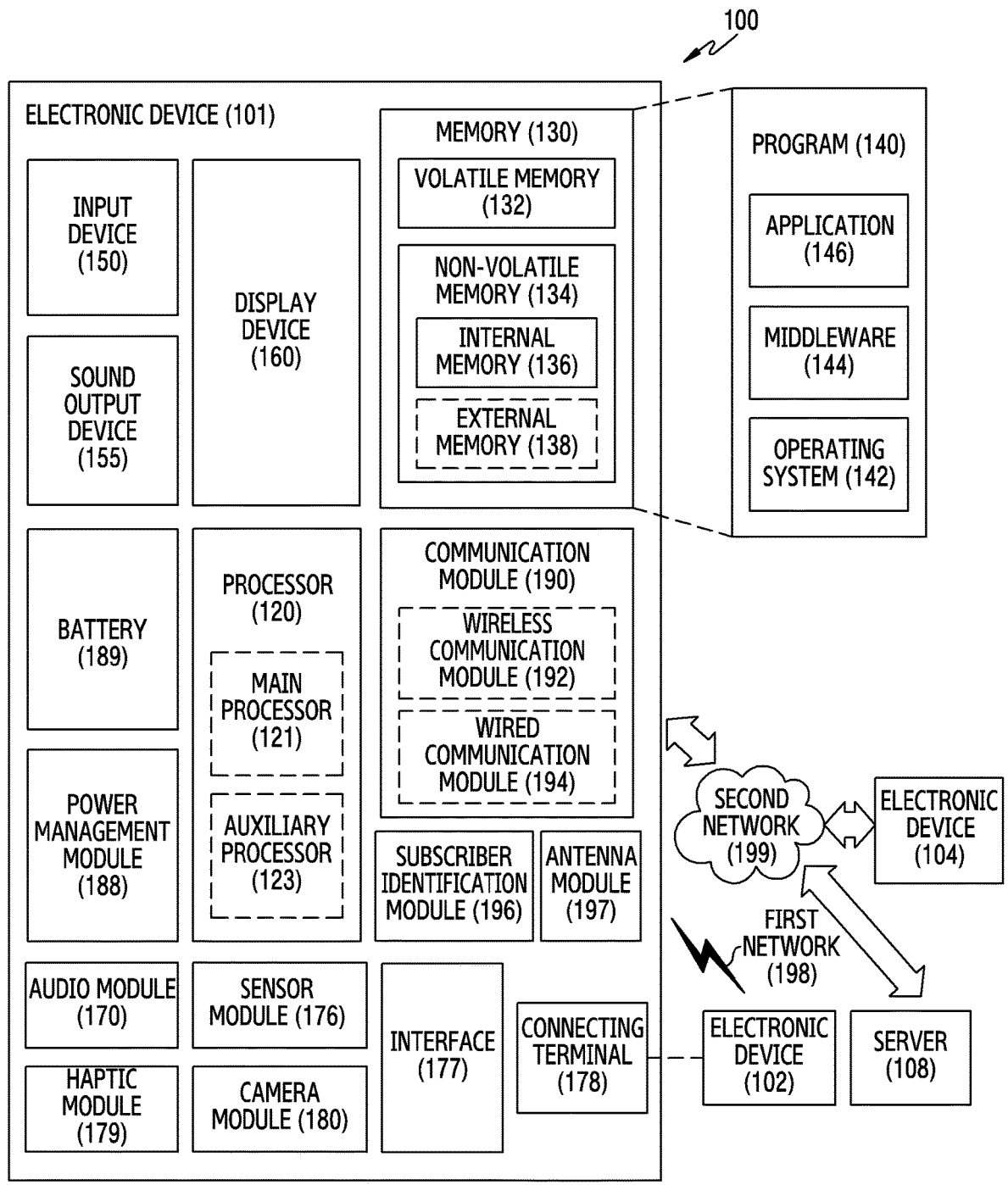
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
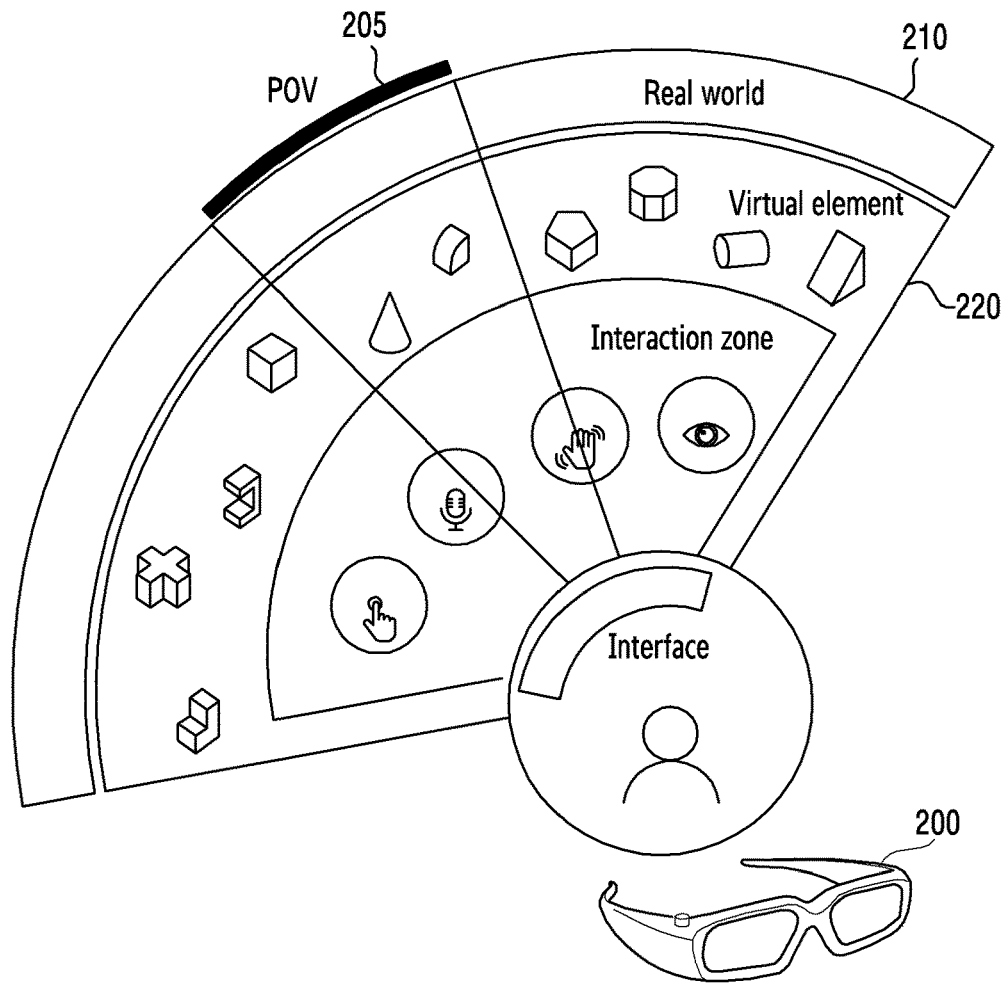
FIGS. 2A and 2B are diagrams illustrating an example relationship among a user, an electronic device, and a virtual object provided via the electronic device according to various embodiments of the disclosure.
Figure 2B:
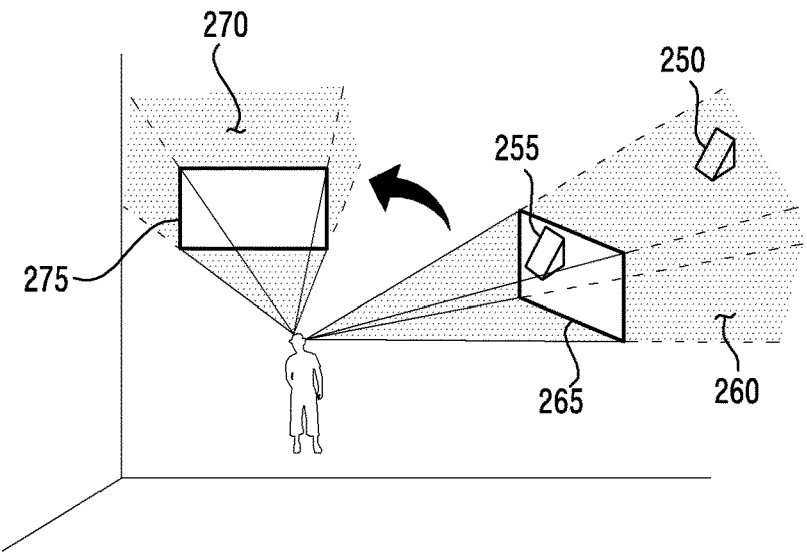

FIGS. 2A and 2B are diagrams illustrating an example relationship among a user, an electronic device, and a virtual object provided via the electronic device according to various embodiments of the disclosure.

Referring to FIG. 2A, an electronic device 200 is disclosed. In an embodiment, the electronic device 200 may correspond to the electronic device 101 of FIG. 1. For example, the electronic device 200 may be a portable electronic device (e.g., a glasses-type wearable device, a mobile terminal such as a smartphone, etc.) capable of providing a user with an interface related to a virtual object or a virtual environment. However, it will be understood that the disclosure is not limited thereto.

According to an embodiment, the electronic device 200 may display the virtual object on a screen in an image or text form.

For example, the electronic device 200 may use an optical see-through scheme so that the user can be provided with a virtual object image superimposed on a real object image. The real object image visible to the user together with the virtual object image may vary depending on a user's Point Of View (POV) 205.

For another example, the electronic device 200 may use a video see-through scheme so that the user can be provided with the virtual object image superimposed on the real object image. In this case, the real object image may be obtained through a camera (not shown, e.g., the camera module 560 of FIG. 5) of the electronic device 200, and the electronic device 200 may display the real object image on the screen. For example, the electronic device 200 may display on the screen a real object image corresponding to a real object which exists in a real world 210. The real object image displayed on the screen of the electronic device 200 may vary depending on the user's POV 205.

According to an embodiment, the electronic device 200 may display a virtual object image corresponding to a virtual element 220 or virtual object which does not exist in the real word but is implemented as if it exists in the real world. The user may have a unique experience which cannot be easily get in the real world, by performing an interaction between the virtual element or virtual object displayed on the screen.

Referring to FIG. 2B, a difference between a Point Of View (POV) and a Field OF View (FOV) will be described hereinafter according to various embodiments of the disclosure.

In an embodiment, the POV may imply a three-dimensional space corresponding to a user's view or view range, and the FOV may imply a two-dimensional region on a screen or display of the electronic device 200 which provides a virtual object image to a user.

In an embodiment, the FOV may be determined according to the user's POV. For example, when the user's view corresponds to a first POV 260, the user may identify a real object 250 included in the first POV 260 from a first FOV 265 (e.g., an object 255 corresponding to the real object 250 may be provided in the FOV 265. For another example, if the user's POV changes from the first POV 260 to a second POV 270 (e.g., if the user turns the user's head to the left), since the real object 250 is no longer included in the user's POV, the user cannot identify the real object 250 from a second FOV 275.

Figure 3A:
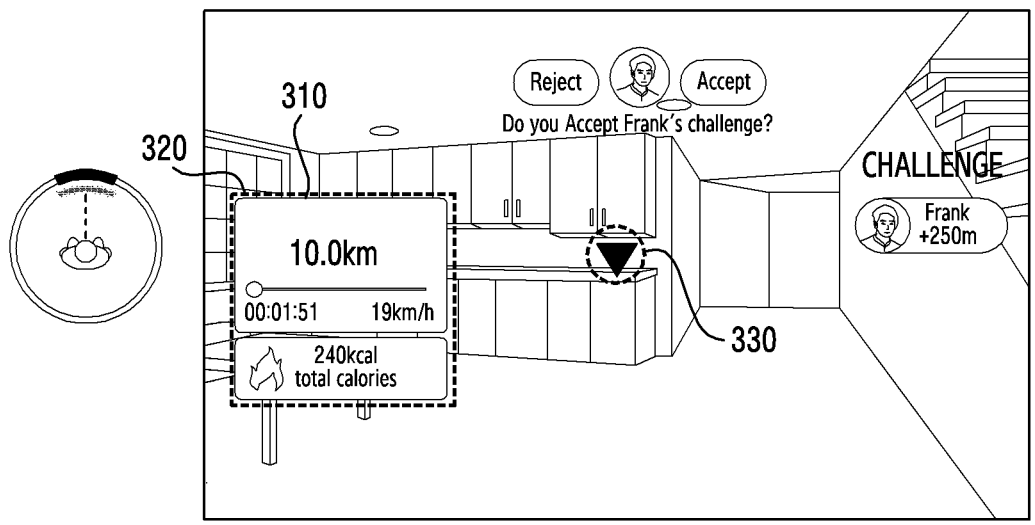
FIGS. 3A and 3B are diagrams illustrating an example first display mode according to various embodiments of the disclosure.
Figure 3B:
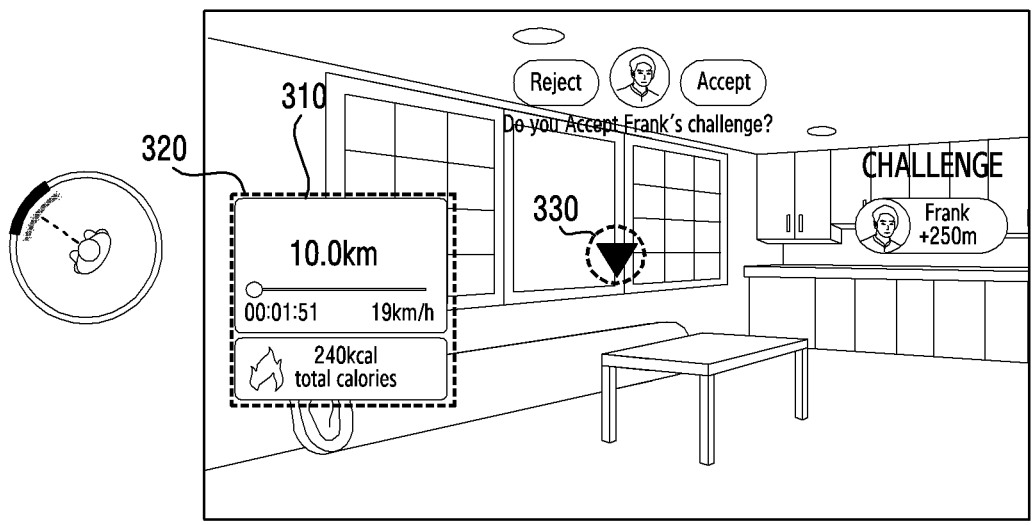

FIGS. 3A and 3B are diagrams illustrating an example first display mode according to various embodiments of the disclosure.

In an embodiment, the first display mode may be a display mode in which at least one virtual object is displayed at a fixed position of a screen irrespective of a user's POV. The first display mode will be described with reference to FIG. 3A and FIG. 3B. Any one of FIG. 3A and FIG. 3B may be a diagram for illustrating a screen of an electronic device (not shown, e.g., the electronic device 200 of FIG. 2) or a screen displayed on a display (e.g., the display 520 of FIG. 5) of the electronic device 200.

Referring to FIG. 3A and FIG. 3B, the electronic device 200 may display at least one virtual object (e.g., a virtual object A 310) in the first display mode. The first display mode may be a display mode in which a position of displaying at least one virtual object is determined irrespective (independent) of a user's POV. Therefore, a position on a screen on which at least one virtual object is displayed may not change even if the user's POV changes. When the user is looking at a kitchen at a front side (FIG. 3A), the virtual object A 310 may be displayed at a first position 320 of the screen. Even if the user turns the user's head to the left (FIG. 3B), the virtual object A 310 may be persistently displayed at the first position 320 of the screen.

In an embodiment, the electronic device 200 may display a virtual object (e.g., a cursor 330) corresponding to a user's view.

In an embodiment, the first display mode may be effective when the user repeats the same motion, in a sense that information can be persistently transferred at a fixed position without reflecting a user's movement to the displaying of the virtual object.

Although not shown, when the user rides a bicycle, the electronic device 200 may display at least one object indicating at least one virtual object (e.g., a workout path, a cumulative workout time, a cumulative workout distance, a current movement speed, an average movement speed, etc.) in the first display mode.

According to an embodiment, a virtual object displayed in the first display mode by the electronic device 200 may be a virtual object (or a virtual reality user interface) capable of interacting with the user. Although not shown, the electronic device 200 may display at a fixed position (e.g., a center of the screen) the virtual reality user interface including a plurality of virtual icons for executing a plurality of applications.

In an embodiment, the first display mode may be referred to as a device-oriented display mode or a screen-anchored display mode.

Figure 4A:
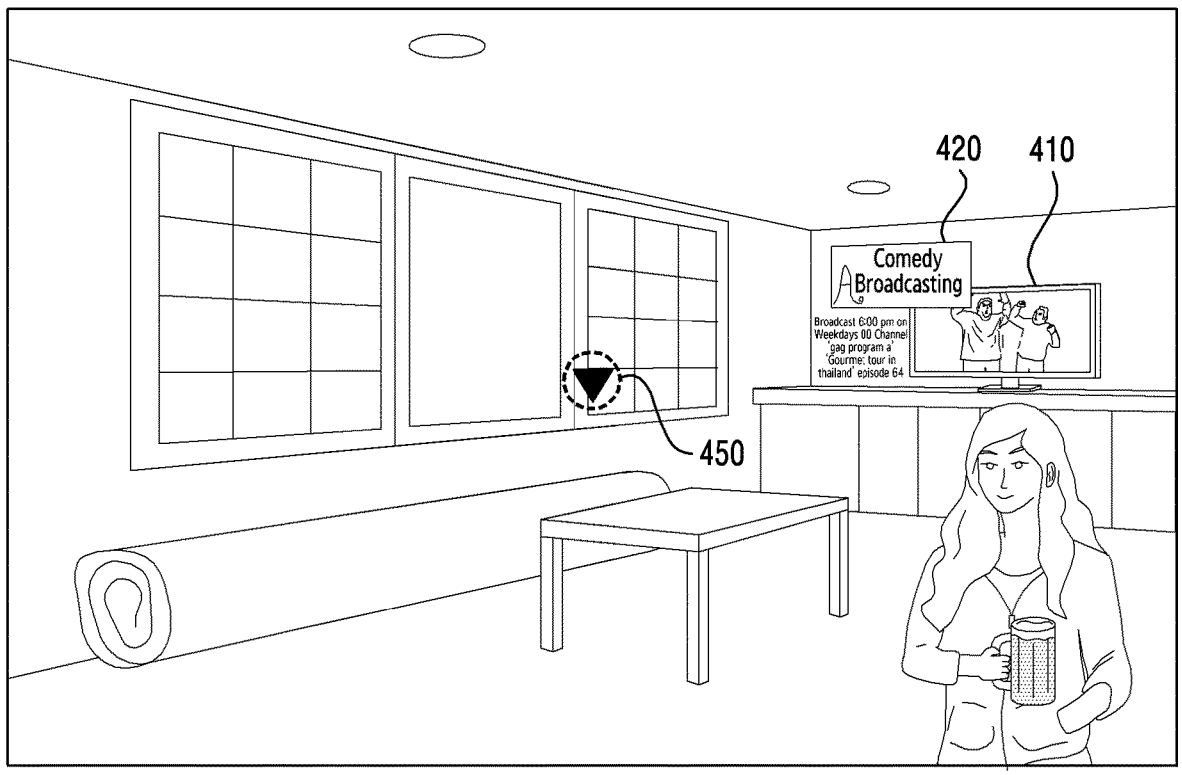
FIGS. 4A and 4B are diagrams illustrating an example second display mode according to various embodiments of the disclosure.
Figure 4B:
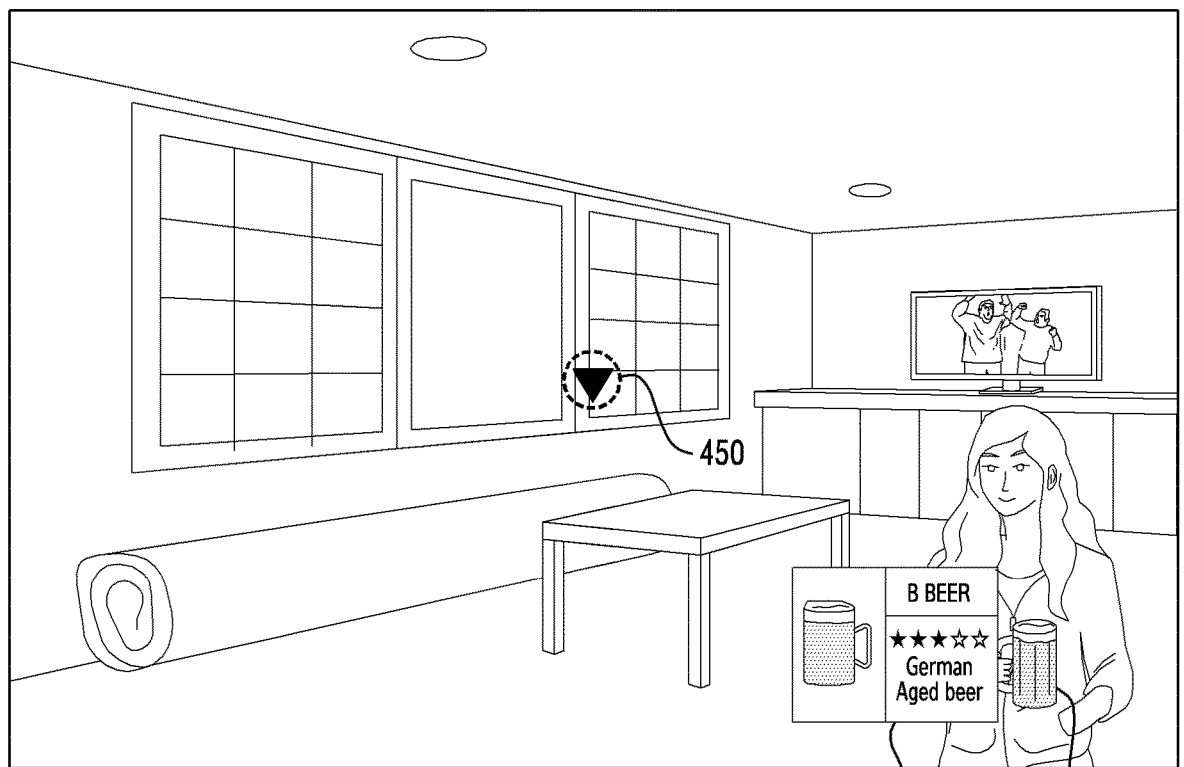

FIGS. 4A and 4B are diagrams illustrating an example second display mode according to various embodiments of the disclosure.

In an embodiment, the second display mode may be a display mode for displaying at least one virtual object on a screen at a position which varies depending on a user's POV. The second display mode will be described with reference to FIG. 4A and FIG. 4B. Any one of FIG. 4A and FIG. 4B may be a diagram for illustrating a screen of an electronic device (not shown, e.g., the electronic device 200 of FIG. 2) or a screen displayed on a display (e.g., the display 520 of FIG. 5) of the electronic device 200.

Referring to FIG. 4A, the electronic device 200 may display at least one virtual object (e.g., a virtual object B 420) in the second display mode. In the second display mode, at least one virtual object may be mapped to a designated coordinate on a real space (or a specific real object on the real space). For example, referring to FIG. 4A, the virtual object B 420 for providing information of a TV program may be mapped to a real space coordinate (a three-dimensional coordinate, e.g., (x1, y1, z1), with a designated position as the origin) at which a real object TV 410 is located. For another example, referring to FIG. 4B, a virtual object C 440 for providing specific information on a real object (e.g., a beer mug 430) may be mapped to the bear mug 430. In this case, even if a user's POV does not change, a position at which the virtual object C 440 is displayed on the screen may change when a position of the beer mug 430 changes.

In an embodiment, the electronic device 200 may change a display position on the screen of at least one virtual object in the second display mode according to a change of the user's POV. For example, if a coordinate on a real space mapped to a specific virtual object is included in the user's POV, the electronic device 200 may display the specific virtual object on the screen. Upon detecting a user's movement (e.g., a head movement) which causes the change of the user's POV, the display position of the specific virtual object may be changed, or whether the specific virtual object is displayed may be changed.

In an embodiment, the electronic device 200 may display a virtual object (e.g., the cursor 450) corresponding to a user's view.

In an embodiment, the second display mode may be referred to as a spaced-oriented display mode or a spaced-anchored display mode.

Figure 5:
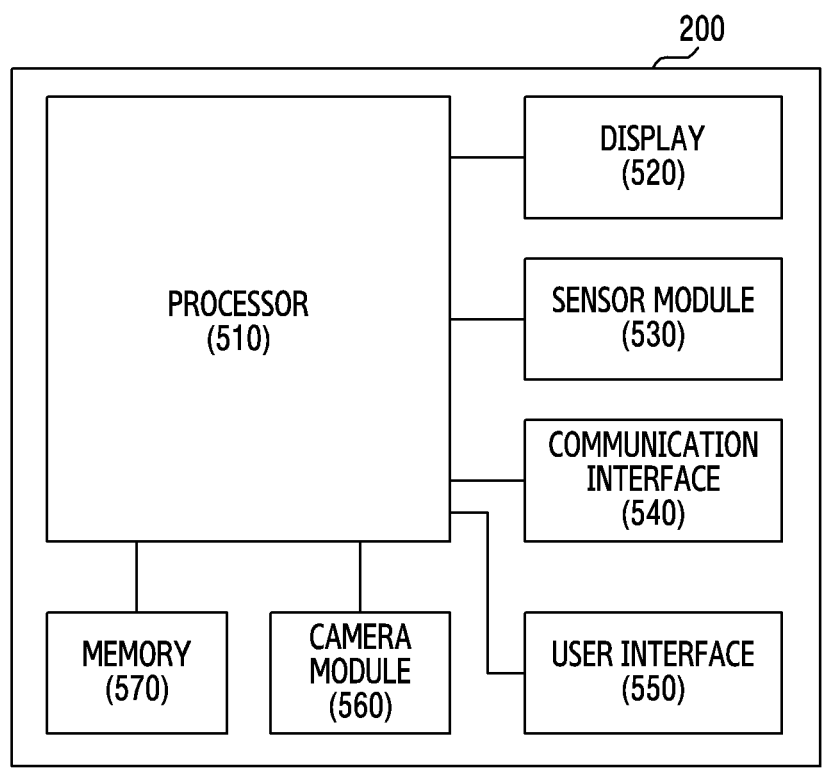
FIG. 5 is a block diagram illustrating an example electronic device according to various embodiments of the disclosure.

FIG. 5 is a block diagram illustrating an example electronic device according to various embodiments of the disclosure.

In an embodiment, the electronic device 200 may include a processor (e.g., including processing circuitry) 510, a display 520, a sensor module 530, a communication interface (e.g., including communication circuitry) 540, a user interface (e.g., including user interface circuitry) 550 and a memory 570. In an embodiment, among them, some components (e.g., the camera module (e.g., including a camera) 560) may not be included in the electronic device 200.

In an embodiment, the processor 510 may include various processing circuitry and be electrically and/or operatively coupled to the display 520, the sensor module 530, the communication interface 540, the user interface 550, the camera module 560, and the memory 570. The processor 510 may provide overall control to the electronic device 200 by controlling operations of the display 520, sensor module 530, communication interface 540, user interface 550, camera module 560, and memory 570. The processor 510 may process data or information received from the display 520, the sensor module 530, the communication interface 540, the user interface 550, the camera module 560, and the memory 570 (e.g., sensor information received from the sensor module 530), and may generate a control command (or output data) based on a result of the processing. For example, the processor 510 may generate screen data to be output to the display 520 via the user interface 550 in response to receiving a first user input for changing a display mode of at least one object (e.g., changing from a first display mode to a second display mode).

In an embodiment, the display 520 may display at least one content. The content displayed on the display 520 may include at least one of a real object image and/or a virtual object image.

In an embodiment, the real object image may be an image obtained through the camera module 560, and the virtual object image may be an image generated by the processor 510. The display 520 may display at least one content in a designated mode under the control of the processor 510. For example, the display 520 may display at least one virtual object in the first display mode in which the object is displayed at a fixed position of the screen.

In an embodiment, the sensor module 520 may include at least one sensor capable of obtaining sensor information related to an electronic device (or a user) with a designated time interval. The sensor module 530 may correspond to the sensor module 176 of FIG. 1. For example, the sensor module 530 may include at least one of a first sensor which detects a movement of the electronic device 200 in association with a user's head movement, a second sensor which detects a movement of a user's pupil, and a third sensor which detects a user's movement or gesture (e.g., a gesture associated with a motion of touching at least one virtual object displayed on the screen). For example, a sensor included in the sensor module 530 may correspond to at least one of a motion sensor, a camera sensor (e.g., a pupil tracking camera, a motion recognition camera), an iris sensor, a gyro sensor, and a direction sensor.

In an embodiment, the communication interface 540 may include various communication circuitry and perform data communication with an external device (e.g., the electronic device 102 of FIG. 1). The communication interface 540 may correspond to the communication module 190 of FIG. 1.

In an embodiment, the user interface 550 may include various user interface circuitry and be an interface disposed to the electronic device 200 to receive a user input. For example, if the electronic device 200 is in an HMD device, the user interface 550 may include a button interface related to at least one button disposed to a surface of the electronic device 200.

In an embodiment, the camera module 560 may capture a real object image. The camera module 560 may correspond to the camera module 180 of FIG. 1.

In an embodiment, the memory 570 may at least temporarily store commands which define an operation of the processor 510 or data or information generated in at least one of the processor 510, the display 520, the sensor module 530, the communication interface 540, the user interface 550, and the camera module 560. For example, the memory 570 may store information on at least one virtual object. For example, the memory 570 may store identification information of at least one virtual object in accordance with a real space coordinate mapped to the at least one object.

Figure 6:
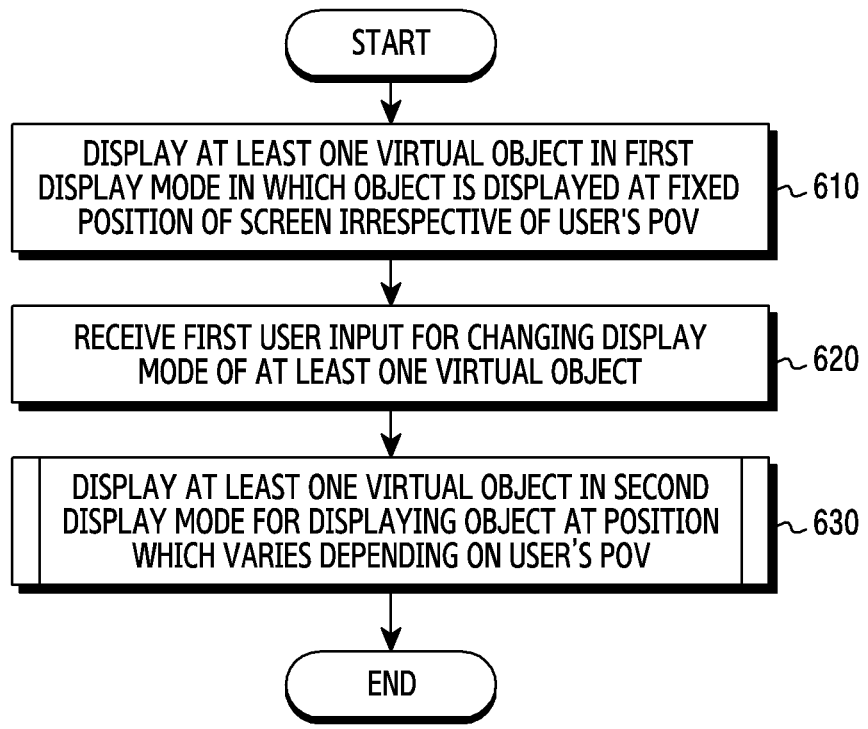
FIG. 6 is a flowchart illustrating an example operation of an electronic device for changing a display mode based on a user input according to various embodiments of the disclosure.

FIG. 6 is a flowchart illustrating an example operation of an electronic device for changing a display mode based on a user input according to various embodiments of the disclosure.

In an embodiment, operations disclosed in FIG. 6 may be performed by an electronic device (e.g., the electronic device 200 of FIG. 2) or a processor (e.g., the processor 510 of FIG. 5). Hereinafter, for convenience, it is described that the operations disclosed in FIG. 6 are performed by the processor 510, although one skilled in the art will understand that the various operations may be performed by the electronic device 200 under control of the processor 510.

In an embodiment, in operation 610, the processor 510 may display at least one virtual object in a first display mode in which the object is displayed at a fixed position of a screen irrespective of a user's POV.

In an embodiment, the processor 510 may display the at least one virtual object in the first display mode by superimposing the object on a real object image corresponding to at least one real object obtained through a camera module (e.g., the camera module 180).

In another embodiment, the processor 510 may display at least one virtual object projected to an optical combiner made of a semi-transparent mirror or a prism, in the first display mode.

Figure 7A:
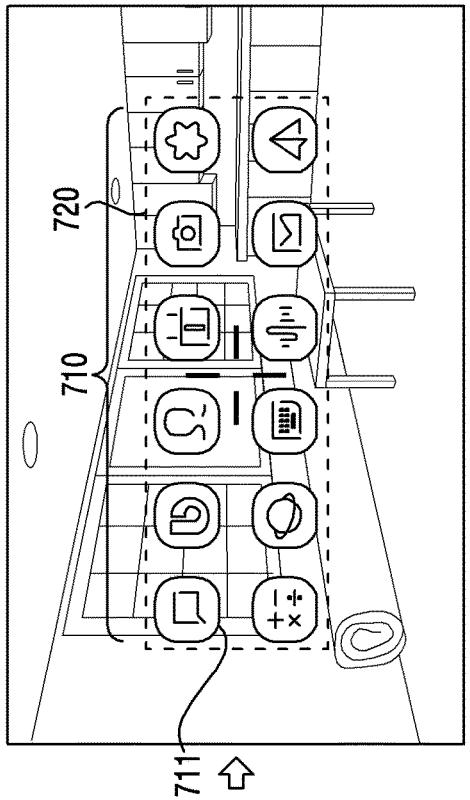
FIGS. 7A, 7B, 7C and 7D are diagrams illustrating examples of changing a display mode according to various embodiments of the disclosure.
Figure 7B:
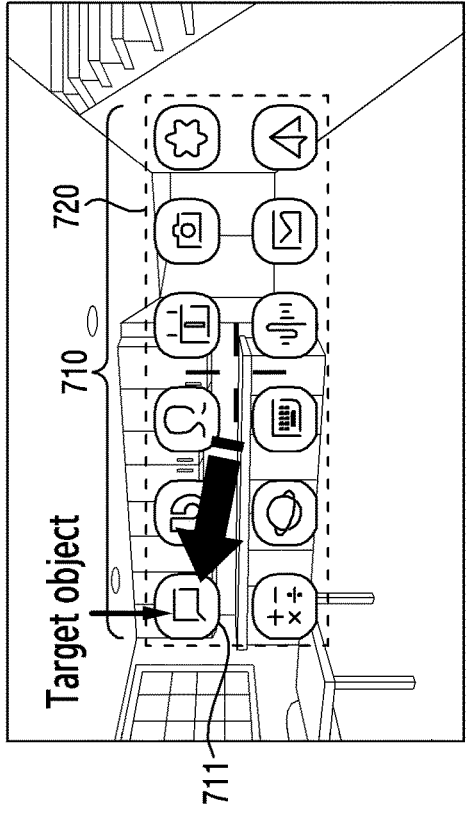

Referring to FIG. 7A, the processor 510 may display at least one virtual object (e.g., a plurality of virtual icons 710) at a fixed position (e.g., a first region 720) of a screen. Referring to FIG. 7B, at least one virtual object 710 displayed in the first region 720 may be displayed fixedly in the first region 720 even if a user turns the user's head to the left to change a user's POV.

In an embodiment, when the virtual object is displayed in the first display mode, since at least one object is displayed at the fixed position of the screen irrespective of the user's POV, conveniently, information to be persistently updated can be identified irrespective of a user's head movement. However, it may be inconvenient for the user to perform an interaction with the virtual object. For example, referring to FIG. 7A, when the user intends to perform an interaction (e.g., selection) with a virtual object A 711 located at a left uppermost end, in general, the user turns the user's head to the left. In this case, however, there is a change only in the real object image which appears to be superimposed on the at least virtual object due to the change of the user's POV, and the position of the virtual object A 711 is not changed. Therefore, the user may not be able to interact with a desired object, or may be able to interact with the desired object only through a more complicated process (e.g., by performing a gesture that seems to touch the virtual object A 711). Accordingly, when the electronic device 200 changes a display mode of at least one virtual object in response to receiving a user input for changing the display mode of the at least one virtual object, the user may interact with the desired object through an easier process (e.g., a head movement or a gaze).

In an embodiment, the at least one virtual object may correspond to at least one function. For example, the at least one virtual object may correspond to at least one function, such as executing of an application installed in the electronic device 200 or providing (or outputting) of content (e.g., a song file or notification information).

In an embodiment, in operation 620, the processor 510 may receive a first user input for changing the display mode of the at least one virtual object. In an embodiment, the processor 510 may receive various types of the first user input. For example, referring to FIG. 8A, the processor 510 may receive the first user input related to the user interface 550 (e.g., a user input for pressing a button to which a function of changing the display mode is designated). For another example, referring to FIG. 8B, the processor 510 may use a third sensor for detecting a user's movement or gesture to receive the first user input for performing a predetermined motion (e.g., a motion that seems to touch (or grab) the at least one virtual object displayed on a screen). For another example, referring to FIG. 8C, the processor 510 may receive a voice input including a predetermined voice keyword (e.g., "notifications") as the first user input. In this case, a notification 810 may be displayed on a screen to indicate that a user's voice input is being received. For another example, referring to FIG. 8D, the processor 510 may receive a gaze input for gazing a designated portion of the screen (or a designated region, e.g., an edge portion of the screen) for at least a designated time, as the first user input.

Figure 7C:
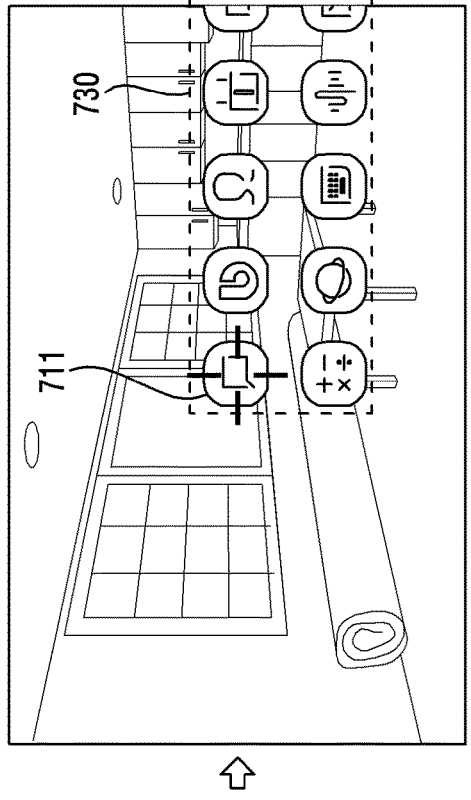
Figure 7D:
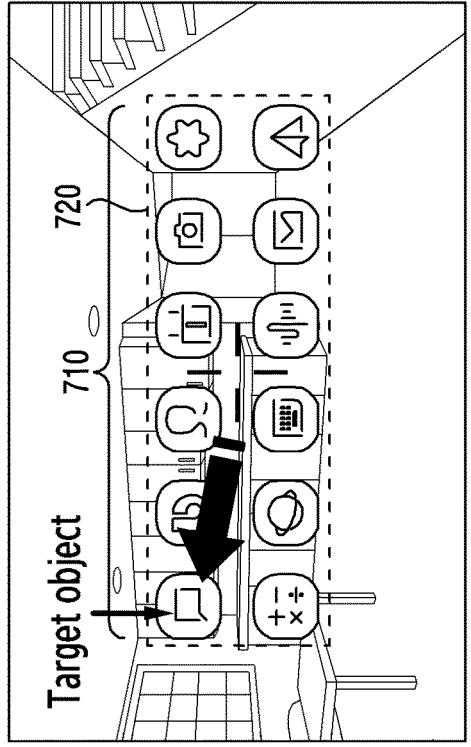

In an embodiment, in operation 630, the processor 510 may display the at least one virtual object in a second display mode for displaying the object at a position which varies depending on a user's POV. For example, referring to FIG. 7C, the processor 510 may display the at least one virtual object (e.g., a plurality of icons 710) at a designated position (e.g., the first region 720) of the screen. Referring to FIG. 7D, the at least one virtual object previously displayed in the first region 720 may be displayed in a second region 730 different from the first region 720 of the screen, if the user turns the user's head to the left to change the user's POV.

In an embodiment, the processor 510 may display at least one virtual object, different from the at least one virtual object, in the second display mode. For example, the processor 510 may display a new virtual object which is previously not displayed on the screen at a time at which the first user input is received, in the second display mode.

Figure 9:
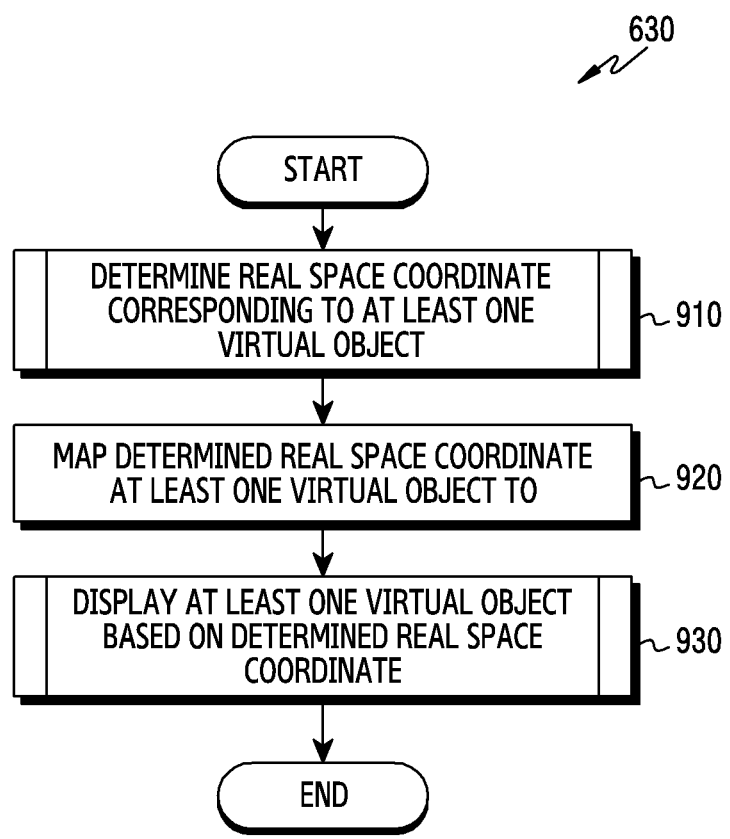
FIG. 9 is a flowchart illustrating an example operation of an electronic device for displaying at least one virtual object in a second display mode according to various embodiments of the disclosure.

FIG. 9 is a flowchart illustrating an example operation of an electronic device used by a user to display at least one virtual object in a second display mode according to various embodiments of the disclosure.

The flowchart of FIG. 9 may, for example, be a detailed flowchart illustrating the operation 630 of FIG. 6.

In an embodiment, in operation 910, the processor 510 may determine a real space coordinate corresponding to at least one virtual object. In an embodiment, the processor 510 may determine the real space coordinate corresponding to one or more virtual objects displayed on a screen in a first display mode.

For example, for a virtual object previously not mapped to a specific real space coordinate, the processor 510 may newly generate a corresponding real space coordinate. For a virtual object previously mapped to the specific real space coordinate, the processor 510 may identify the mapped real space coordinate.

In an embodiment, the processor 510 may determine a real space coordinate corresponding to the at least one virtual object by using a real space coordinate corresponding to a position of the user or a position of part of a user's body (e.g., a position of user's eye) and a real space coordinate corresponding to a position at which the at least one virtual object is displayed inside a screen. For example, the processor 510 may determine the real space coordinate corresponding to the at least one virtual object as a coordinate ((x0+x1)/2, (y0+y1)/2, (z0+z1)/2) of a point obtained by internally dividing a real space coordinate (x0, y0, z0) corresponding to the user's position and a real space coordinate (x1, y1, z1) corresponding to the position at which the at least one virtual object is displayed inside the screen by a designated ratio (e.g., 5:5).

In an embodiment, when the processor 510 may determine the real space coordinate corresponding to the at least one virtual object, a time at which the first user input is received may be used by reference.

In an embodiment, in operation 920, the processor 510 may map the at least one virtual object to the determined real space coordinate. For example, the processor 510 may store identification information corresponding to the at least one virtual object in the memory 570 in accordance with the determined real space coordinate.

In an embodiment, in operation 930, the processor 510 may display the at least one virtual object based on the determined real space coordinate. The processor 510 may display the at least one virtual object to a display (e.g., the display 520), based on the determined real space coordinate. The processor 510 may display a virtual object located at the determined real space coordinate to the display 520 as if it is a real object located at a specific real space coordinate (e.g., a building located at a specific latitude and longitude). For example, only when the determined real space coordinate is included in a user's POV, the at least one virtual object may be displayed on the display 520. For example, if the user turns around, the at least one virtual object may be no longer displayed on the display 520. For another example, when the user turns the user's head to the left, the at least one virtual object may be displayed by being moved further to the right on the screen.

Figure 10:
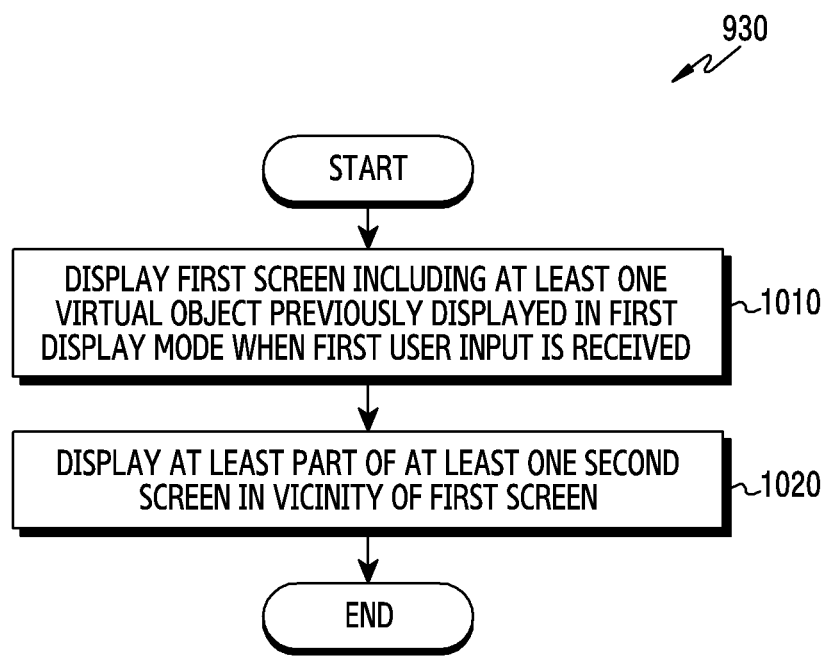
FIG. 10 is a flowchart illustrating an example operation of an electronic device for displaying at least one virtual object according to various embodiments of the disclosure.

FIG. 10 is a flowchart illustrating an example operation of an electronic device for displaying at least one virtual object according to various embodiments of the disclosure.

The flowchart of FIG. 10 may, for example, be a detailed flowchart illustrating the operation 930 of FIG. 9.

Figure 11:
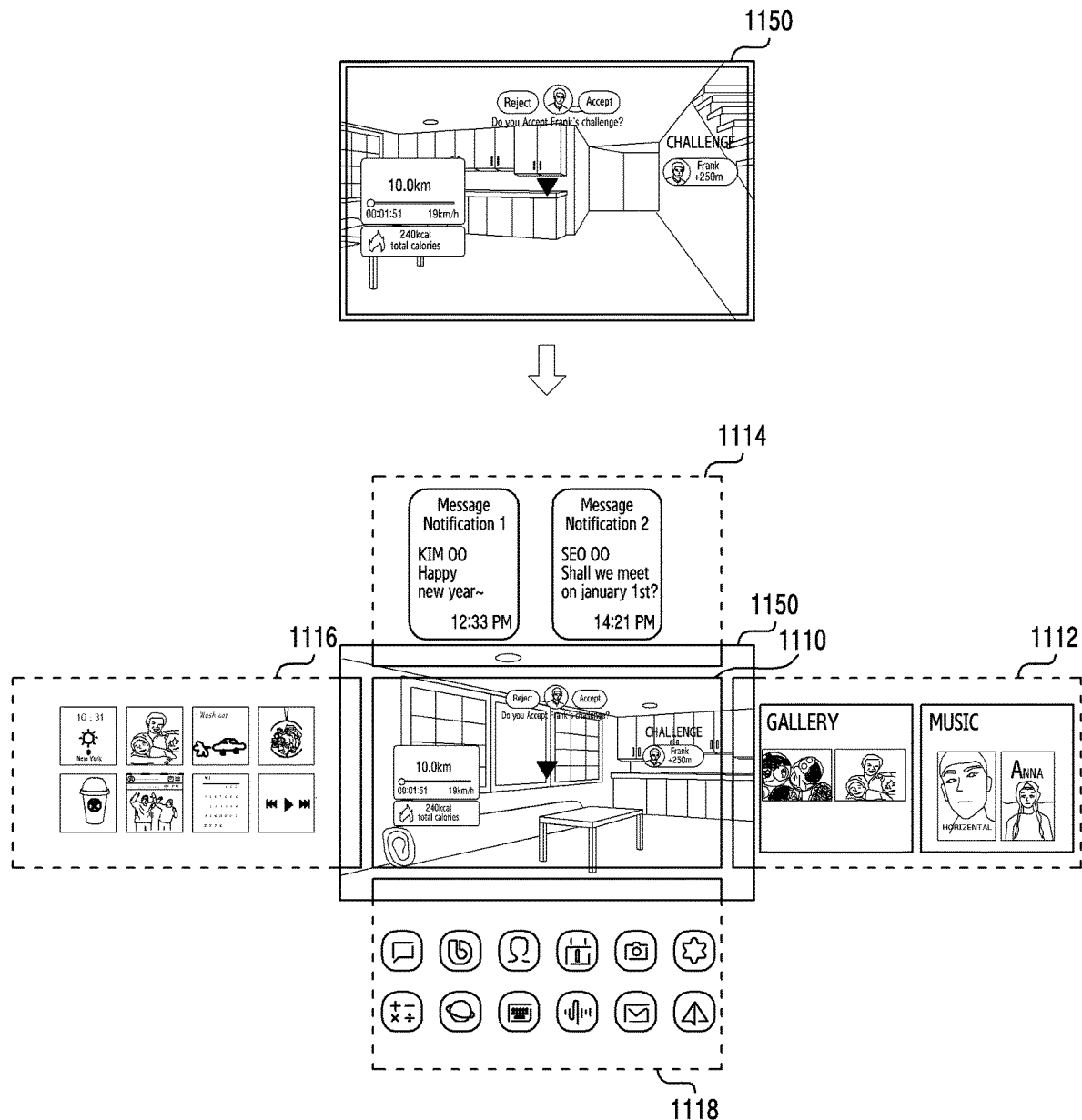
FIG. 11 is a diagram illustrating an example of one first screen and at least one second screen according to various embodiments of the disclosure.

In an embodiment, in operation 1010, the processor 510 may display a first screen on the display 520. The first screen may include the at least one virtual object previously displayed in a first display mode when a first user input is received in operation 620. For example, referring to FIG. 11, upon receiving the first user input, the processor 510 may display a first screen 1110 including all virtual objects previously displayed on the display 520 in the first display mode.

In an embodiment, the processor 510 may display the first screen 1110 with a size which is the same as a size obtained by reducing a size of a full screen 1150 displayed on the display 520 by a designated ratio. For example, if the size of the full screen displayed on the display 520 is a first size, the processor 510 may display the first screen 1110 with a second size which is the same as a size obtained by reducing the first size by a designated ratio.

In an embodiment, the processor 510 may display the first screen 1110 on the display 520 based on a range of a designated real space coordinate.

For example, the processor 510 may determine the range of the real space coordinate corresponding to the first screen 1110 by using at least one real space coordinate corresponding to at least one virtual object included in the first screen 1110, and may display the first screen 1110 on the display 520 based on the determined real space coordinate range.

For another example, the processor 510 may determine the range of the real space coordinate corresponding to the first screen 1110 using a real space coordinate corresponding to a position of a user's body part (e.g., a coordinate corresponding to a user's eye), real space coordinates corresponding to an edge or boundary of a screen, and the designated ratio, and may display the first screen 1110 on the display 520 based on the determined real space coordinate range.

In an embodiment, the processor 510 may display the first screen 1110 at a designated portion of the display 520. For example, the processor 510 may display the first screen at a center of the display 520.

In an embodiment, in operation 1020, the processor 510 may display at least part of one or more second screens 1112, 1114, 1116, and 1118 (which may be referred to hereinafter as 1112 to 1118) in the vicinity of the first screen 1110. For example, referring to FIG. 11, the processor 510 may display at least part of the four second screens 1112, 1114, 1116, and 1118 at upper, lower, left, and right sides of the first screen 1110.

In an embodiment, the processor 510 may display at least one of the second screens 1112 to 1118 on the display 520 based on a designated real space coordinate range similarly to the first screen 1110. The processor 510 may determine a real space coordinate range corresponding to the at least one of the second screens 1112 to 1118 using at least one of a real space coordinate range corresponding to the first screen 1110, a positional relationship between the first screen 1110 and the at least one of the second screens 1112 to 1118, and an interval of the first screen 1110 and the at least one of the second screens 1112 to 1118, and may display the at least one of the second screens 1112 to 1118 on the display 520 based on the determined real space coordinate range.

In an embodiment, each of the at least one of the second screens 1112 to 1118 may include at least one virtual object, and the at least one virtual object may correspond to at least one function. The at least one virtual object included in one second screen (any one of the second screens 1112 to 1118) may share the same (or similar) attribute, character, or display form. For example, at least one virtual object included in the second screen 1114 displayed at the upper side of the first screen may include at least one virtual object related to a notification (or providing the notification) generated within a designated time from a present moment. For another example, at least one virtual object included in the second screen 1118 displayed at the lower side of the first screen may include a virtual object for executing at least one application installed in the electronic device 200. For another example, at least one virtual object included in the second screen 1116 displayed at the left side of the first screen may be displayed in a widget form. For another example, at least one virtual object included in the second screen 1112 displayed to the right side of the first screen may include a virtual object related to a task manager.

In an embodiment, an arrangement of at least one of the second screens 1112 to 1118 may vary depending on a user's configuration. For example, at least one virtual object included in the second screen 1112 displayed to the right side of the first screen may include at least one virtual object related not to the task manager but to the notification generated within the designated time from the current moment.

The user may expand a search region of the virtual object according to the embodiment of FIG. 10. In response to receiving the first user input for changing the display mode, the electronic device 200 may display at least one virtual object, which is being displayed on the screen in the first display mode, in a second display mode as described above. Since the second display mode is a display mode in which a display position of a virtual object changes according to a change of a user's POV, when the user turns the user's head (e.g., to the left), the display position of the virtual object is moved relatively to the right within the screen, and the virtual object is no longer displayed if it is out of a right boundary of the screen. As such, if the display position of the virtual object or whether the virtual object is displayed changes according to the change of the user's POV, a search region of the virtual object is not simply limited to be inside the screen, but may be extended out of the screen. This is because the user can access the virtual object not displayed on the current screen by simply turning the user's head since the virtual object is fixed to a real space coordinate mapped instead of being fixed to a coordinate within the screen.

Figure 12:
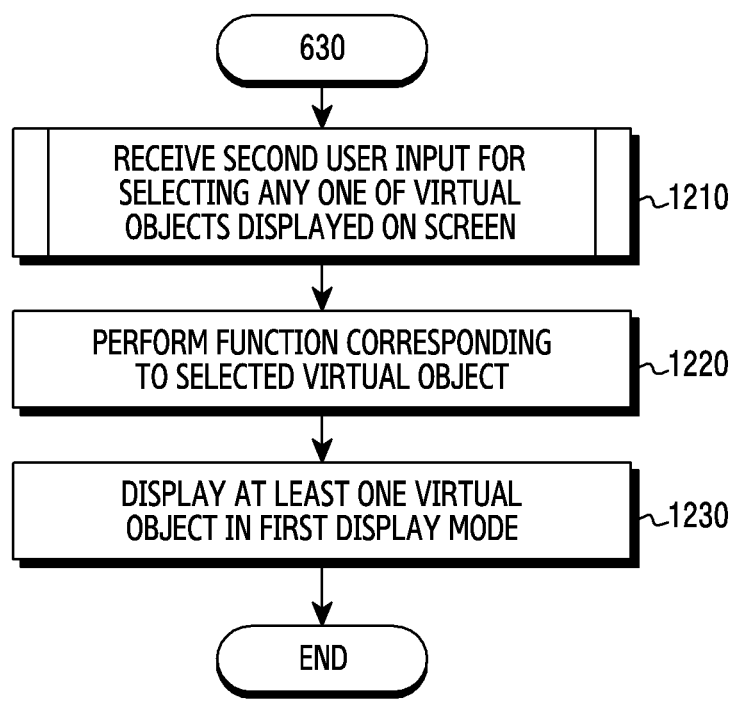
FIG. 12 is a flowchart illustrating an example operation of an electronic device for performing a function corresponding to a selected virtual object, based on a user input for selecting the virtual object according to various embodiments of the disclosure.

FIG. 12 is a flowchart illustrating an example operation of an electronic device for performing a function corresponding to a selected virtual object, based on a user input for selecting the virtual object according to various embodiments of the disclosure.

Operations disclosed in FIG. 12 may, for example, be performed after the operation 630 is performed.

In an embodiment, in operation 1210, the processor 510 may receive a second user input for selecting any one of at least one virtual object displayed on a screen. In an embodiment, the at least one virtual object displayed on the screen may be a virtual object previously displayed in a first display mode when a first user input is received or may be a virtual object previously not displayed in the first display mode when the first user input is received.

In an embodiment, similarly to the first user input, the second user input for selecting any one of the virtual objects displayed on the screen may include, for example, and without limitation, any one of an input related to a user interface (e.g., the user interface 550 of FIG. 5), an input related to a user's motion or gesture, a voice input including a predetermined voice keyword, and a gaze input for gazing a designated portion (or any one virtual object) of the screen. For example, the processor 510 may receive the second user input of gazing any one virtual objects for at least a designated time among the virtual objects displayed on the screen.

In an embodiment, the processor 510 may receive the second user input for selecting the virtual object previously displayed on the screen within a designated time from a current moment. For example, the processor 510 may receive a voice input for selecting the virtual object previously displayed on the screen within the designated time from the current moment.

In an embodiment, in operation 1220, the processor 510 may perform a function corresponding to the selected virtual object. For example, upon selecting a virtual object corresponding to a function of executing an application A, the processor 510 may execute the application A, and may display an execution screen of the application A on the display 520. For another example, upon selecting a virtual object corresponding to a function of providing a notification A, content of the notification A may be displayed on the display 520.

In an embodiment, in operation 1230, the processor 510 may display at least one virtual object in the first display mode. For example, the processor 510 may change the display mode from a second display mode to the first display mode after performing the function corresponding to the selected virtual object.

Although not shown, the processor 510 may maintain the display mode to the second display mode after performing the function corresponding to the selected virtual object.

Figure 13:
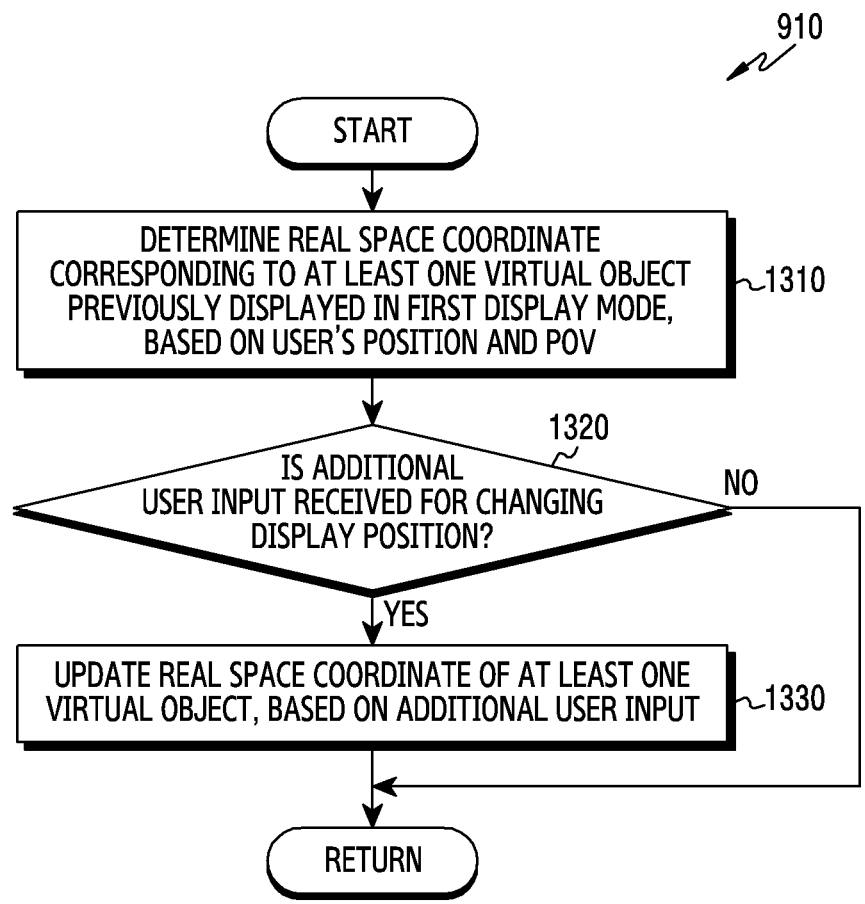
FIG. 13 is a flowchart illustrating an example operation of an electronic device for determining a real space coordinate corresponding to at least one virtual object according to various embodiments of the disclosure.

FIG. 13 is a flowchart illustrating an example operation of an electronic device for determining a real space coordinate corresponding to at least one virtual object according to various embodiments of the disclosure.

The flowchart of FIG. 13 may, for example, be a detailed flowchart illustrating the operation 910 of FIG. 9.

Figure 14A:
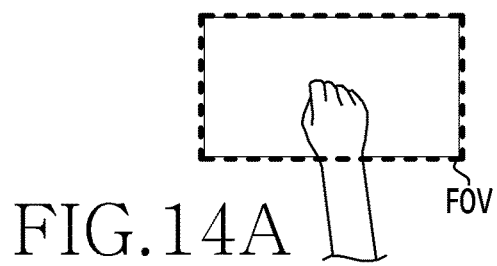
FIGS. 14A, 14B, 14C and 14D are diagrams illustrating an example operation of an electronic device for determining a real space coordinate corresponding to at least one virtual object, based on a user's gesture, according to various embodiments of the disclosure.

Operations disclosed in FIG. 13 may be performed when a first user input is a gesture input for performing a predetermined motion or an input related to the user interface 550. For example, referring to FIG. 14A, the first user input may be a gesture input for performing a predetermined motion (e.g., a motion of grabbing at least one virtual object displayed on the screen).

In an embodiment, in operation 1310, the processor 510 may determine a real space coordinate corresponding to at least one virtual object previously displayed on the display 520 in a first display mode, based on a user's position and a user's POV. For example, if a real space coordinate corresponding to the user's position is ($x0, y0, z0$) and a real space coordinate corresponding to a position at which a virtual object A in the screen is previously displayed in the first display mode is ($x1, y1, z1$), a real space coordinate corresponding to the virtual object A may be determined to ($xa, ya, za$). ($xa, ya, za$) may be a coordinate of a point obtained by internally dividing ($x0, y0, z0$) and ($x1, y1, z1$) by a designated ratio.

Figure 14B:
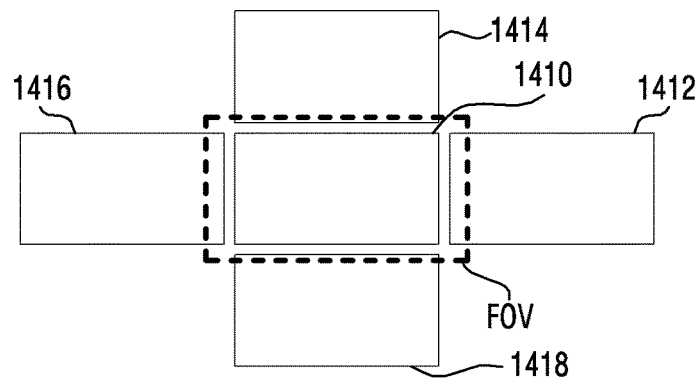

In an embodiment, the processor 510 may determine a real space coordinate range corresponding to one first screen and at least one second screen using a real space coordinate corresponding to the determined at least one virtual object. The processor 510 may display the first screen and the second screen in a second display mode by using the determined real space coordinate range. For example, referring to FIG. 14B, the processor 510 may display one first screen 1410 and four second screens 1412, 1414, 1416, and 1418 in the second display mode. For example, each of the four second screens 1412, 1414, 1416, and 1418 may correspond to a designated attribute, character, or a designated display form, in relation to at least one virtual object included in the screen.

Figure 14C:
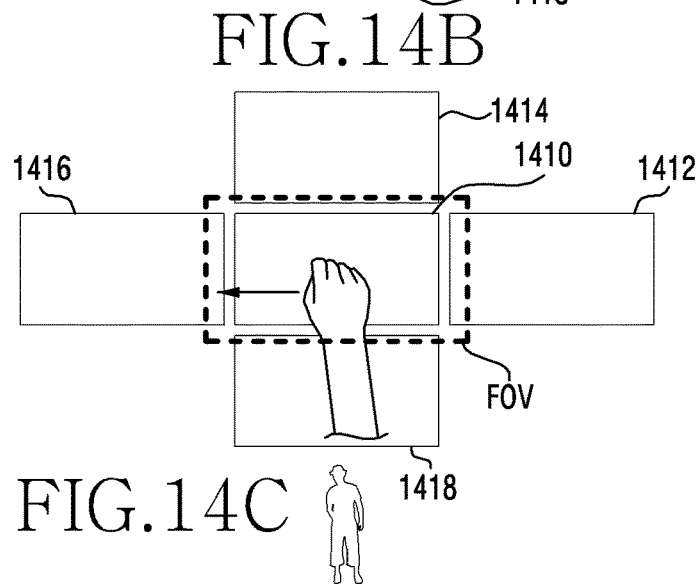

In an embodiment, in operation 1320, the processor 510 may identify whether an additional user input for changing a display position is received. The additional user input for changing the display position may be a user input of the same type as the first user input, or may be a user input of a type different from the first user input. For example, referring to FIG. 14C, if the first user input is a gesture input for performing a predetermined motion (e.g., a motion of grabbing at least one virtual object displayed on the screen), the processor 510 may receive an additional gesture that seems to move the first screen 1410 to the left. For another example, if the first user input is an input related to the user interface 550 (e.g., an input for pressing a button disposed to a surface of the electronic device 200), the processor 510 may also receive the additional gesture input that seems to move the first screen 1410 to the left.

In an embodiment, the additional user input for changing the display position may be a user input for updating a real space coordinate corresponding to the first screen 1410 and the second screens 1412, 1414, 1416, and 1418.

In an embodiment, if a user input for changing the display position of the first screen 1410 and second screens 1412, 1414, 1416, and 1418 is not received, the procedure may proceed to the operation 920. The processor 510 may perform the operation 920 using the real space coordinate (e.g., (xa, ya, za)) determined in operation 1310.

Figure 14D:
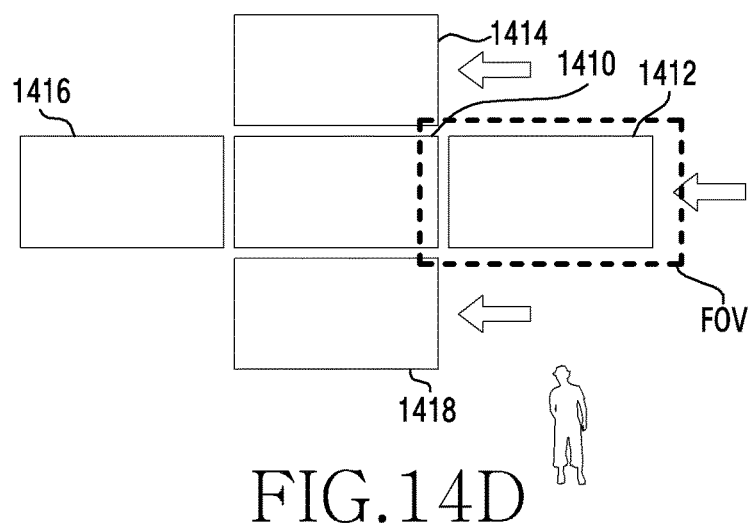

In an embodiment, in operation 1330, the processor 510 may update a real space coordinate of the at least one virtual object, based on the additional user input. Referring to FIG. 14D, for example, upon receiving an additional user input that seems to move the first screen 1410 to the left, a real space coordinate corresponding to the specific virtual object may be updated from (xa, ya, za) to (xa-k, ya, za), so that the specific virtual object (or the first screen 1410 including the specific virtual object) is visible at a left side rather than a front side within a user's view. Accordingly, the second screen 1412 located to a right side of the first screen may be visible at a front side within the user's view. Although only an x-axis coordinate is decreased by k herein, this is for illustrative purposes only, and it will be apparent to those skilled in the art that various changes are possible by a designated value in one or more coordinates according to a configuration of a coordinate axis.

In an embodiment, the real space coordinate to be updated may be determined according to an attribute of the additional user input (e.g., according to a direction of a user gesture). For example, if the additional user input is a user gesture that seems to move the first screen 1410 to the left, a real space coordinate corresponding to the specific virtual object may be updated to (xa-k, ya, za), and if the additional user input is a user gesture that seems to move the first screen 1410 to the right, the real space coordinate corresponding to the specific virtual object may be updated to (xa+k, ya, za).

In an embodiment, the real space coordinate of the virtual object included in the first screen may be updated so that a specific second screen is disposed at a center of the display 520. For example, if the additional user input is a user gesture that seems to move the first screen to the left, a real space coordinate corresponding to a virtual object included in the first screen 1410 and at least one of the second screens 1412 to 1418 may be updated so that the second screen 1412 disposed to the right side of the first screen 1410 is disposed at the center of the screen. For another example, if the additional user input is a user gesture that seems to move the first screen 1410 to the right, the real space coordinate corresponding to the virtual object included in the first screen 1410 and at least one of the second screens 1412 to 1418 may be updated so that the second screen 1416 disposed to the left side of the first screen 1410 is disposed at the center of the screen.

In an embodiment, the real space coordinate of the virtual object included in the first screen 1410 may be updated so that the first screen 1410 is disposed by enlarging or reducing a size thereof.

For example, if the additional user input is a user gesture that seems to pull the first screen 1410 in a user direction, the processor 510 may update the real space coordinate corresponding to the virtual object included in the first screen 1410 so that the first screen 1410 is displayed by enlarging a size thereof (e.g., the processor 510 may determine a point obtained by internally dividing a real space coordinate (xa, ya, za) corresponding to the virtual object included in the first screen 1410 and a real space coordinate (x1, y1, z1) corresponding to a user's position by a designated ratio as a new real space coordinate corresponding to the virtual object).

For another example, if the additional user input is a user gesture that seems to push the first screen 1410 in a direction opposite to the user direction, the processor 510 may update the real space coordinate corresponding to the virtual object included in the first screen so that the first screen 1410 is displayed by reducing a size thereof (e.g., the processor 510 may determine a point obtained by internally dividing a real space coordinate (xa, ya, za) corresponding to the virtual object included in the first screen and a real space coordinate (x1, y1, z1) corresponding to a position at which the virtual object A in the screen is previously displayed in the first display mode).

In an embodiment, the processor 510 may proceed to the operation 920. For example, the processor 510 may perform the operation 920 using the updated real space coordinate of the virtual objects.

Figure 15:
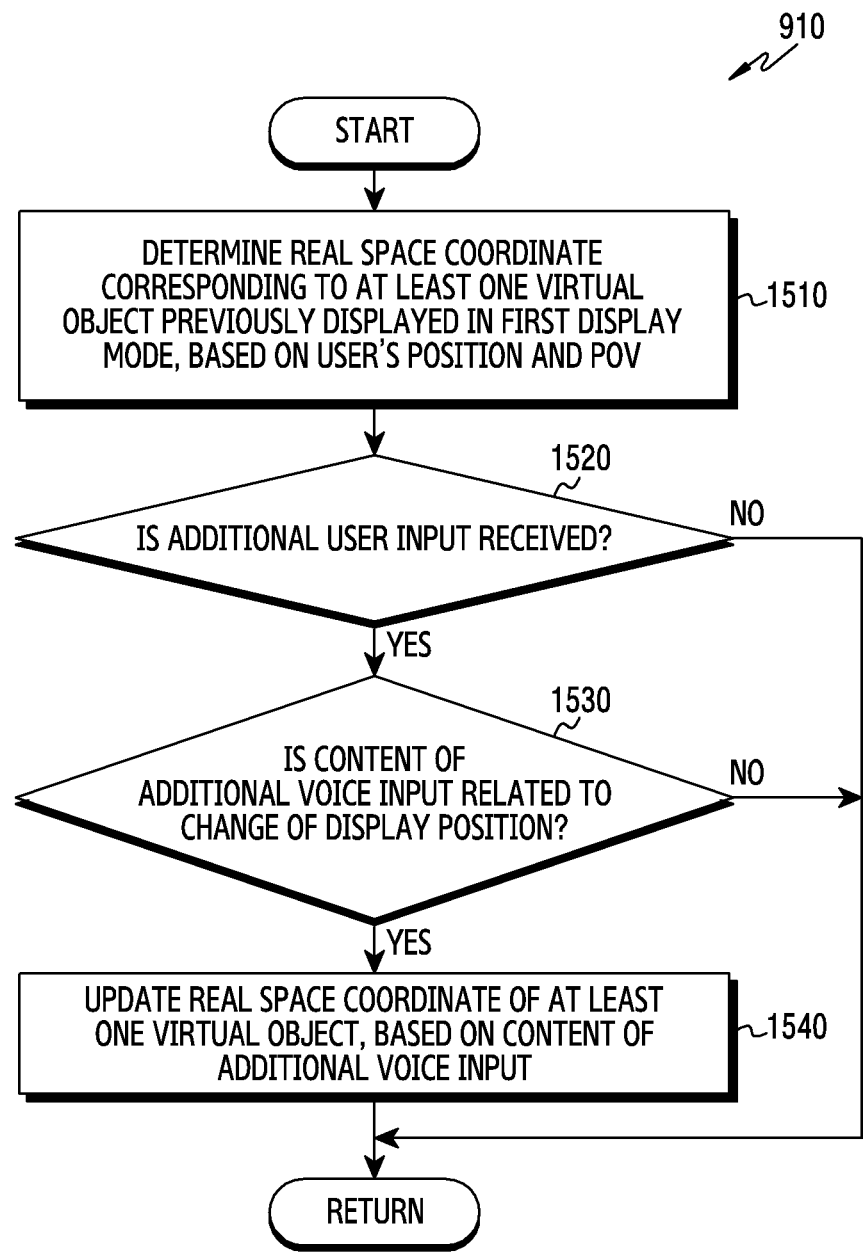
FIG. 15 is a flowchart illustrating an example operation of an electronic device for determining a real space coordinate corresponding to at least one virtual object according to various embodiments of the disclosure.

FIG. 15 is a flowchart illustrating an example operation of an electronic device for determining a real space coordinate corresponding to at least one virtual object according to various embodiments of the disclosure.

The flowchart of FIG. 15 may, for example, be a detailed flowchart illustrating the operation 910 of FIG. 9.

Figure 16A:
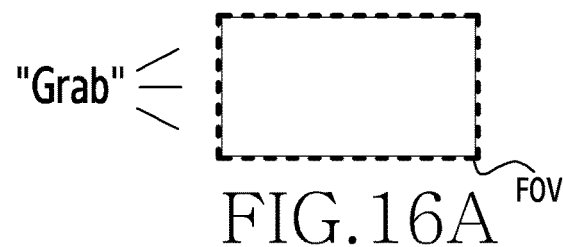
FIGS. 16A, 16B, 16C and 16D are diagrams illustrating an example operation of an electronic device for determining a real space coordinate corresponding to at least one virtual object, based on a user's voice input, according to various embodiments of the disclosure.

Operations disclosed in FIG. 15 may be performed when a first user input is a voice input including a predetermined voice keyword. Referring to FIG. 16A, the first user input may be a voice input including a predetermined voice keyword "grab".

In an embodiment, in operation 1510, the processor 510 may determine a real space coordinate corresponding to at least one virtual object previously displayed on the display 520 in a first display mode, based on a user's position and a user's POV. For example, if a real space coordinate corresponding to the user's position is (x0, y0, z0) and a real space coordinate corresponding to a position at which a virtual object A in the screen is previously displayed in the first display mode is (x1, y1, z1), a real space coordinate corresponding to the virtual object A may be determined to (xa, ya, za). (xa, ya, za) may be a coordinate of a point obtained by internally dividing (x0, y0, z0) and (x1, y1, z1) by a designated ratio.

Figure 16B:
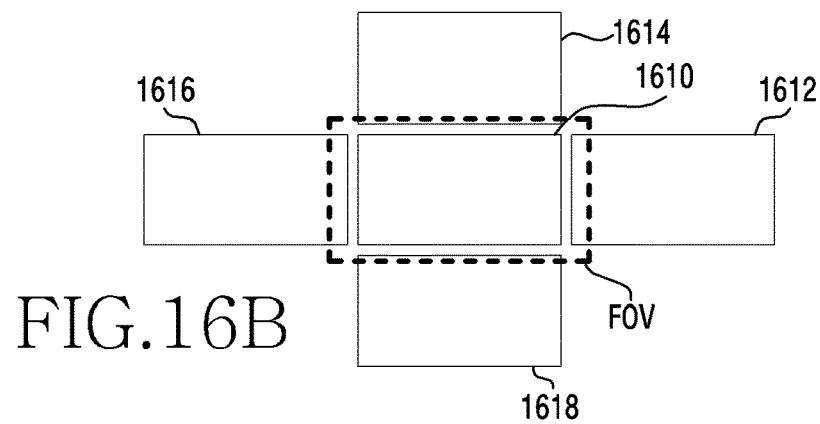

In an embodiment, the processor 510 may determine a real space coordinate range corresponding to one first screen and at least one second screen using a real space coordinate corresponding to the determined at least one virtual object. The processor 510 may display the first screen and the second screen in a second display mode using the determined real space coordinate range. For example, referring to FIG. 16B, the processor 510 may display one first screen 1610 and four second screens 1612, 1614, 1616, and 1618 in the second display mode.

Figure 16C:
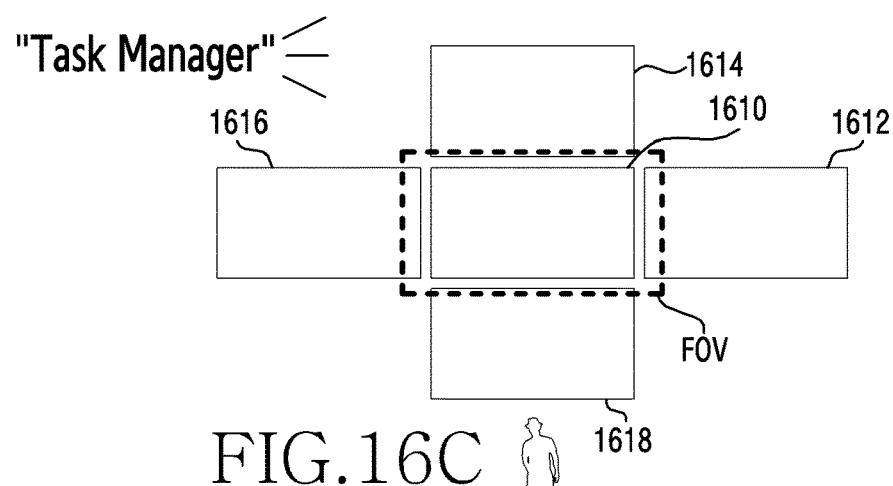

In an embodiment, in operation 1520, the processor 510 may identify whether an additional voice input is received. The processor 510 may perform operation 1530 if the additional voice input is received for a designated time, may perform the operation 920 if the additional voice input is not received. Referring to FIG. 16C, the processor 510 may receive an additional voice input such as "task manager".

In an embodiment, in operation 1530, the processor 510 may identify whether content of the additional voice input is related to a change of a display position. For example, if the additional voice input includes a voice keyword "task manager" indicating the second screen 1612 displayed at a right side of the first screen 1610. For another example, if the additional voice input includes a voice keyword (e.g., up, down, left, right) indicating a direction, the processor 510 may determine that content of the additional voice input is related to the change of the display position. The processor 510 may perform operation 1540 if the content of the additional voice input is related to the change of the display position, and may perform the operation 920 if the content is not related to the change of the display position. For example, if the content of the additional voice input is not related to the change of the display position, the processor 510 may perform the operation 920 using the real space coordinate determined operation 1510.

In an embodiment, in operation 1540, the processor 510 may update a real space coordinate of the at least one virtual object, based on the content of the additional voice input.

Figure 16D:
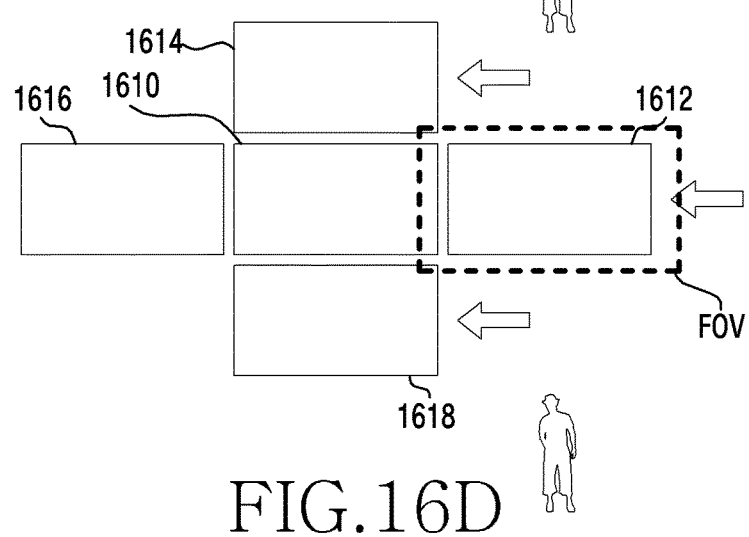

For example, upon receiving the additional voice input including the voice keyword "task manager" indicating the second screen 1612 displayed at the right side of the first screen 1610, a real space coordinate corresponding to the specific virtual object may be updated from (xa, ya, za) to (xa-k, ya, za), so that the specific virtual object (or the first screen 1610 including the specific virtual object) is visible at a left side rather than a front side within a user's view. Accordingly, referring to FIG. 16D, the second screen 1612 located at the right side of the first screen 1610 may be visible at the front side within the user's view.

Figure 17:
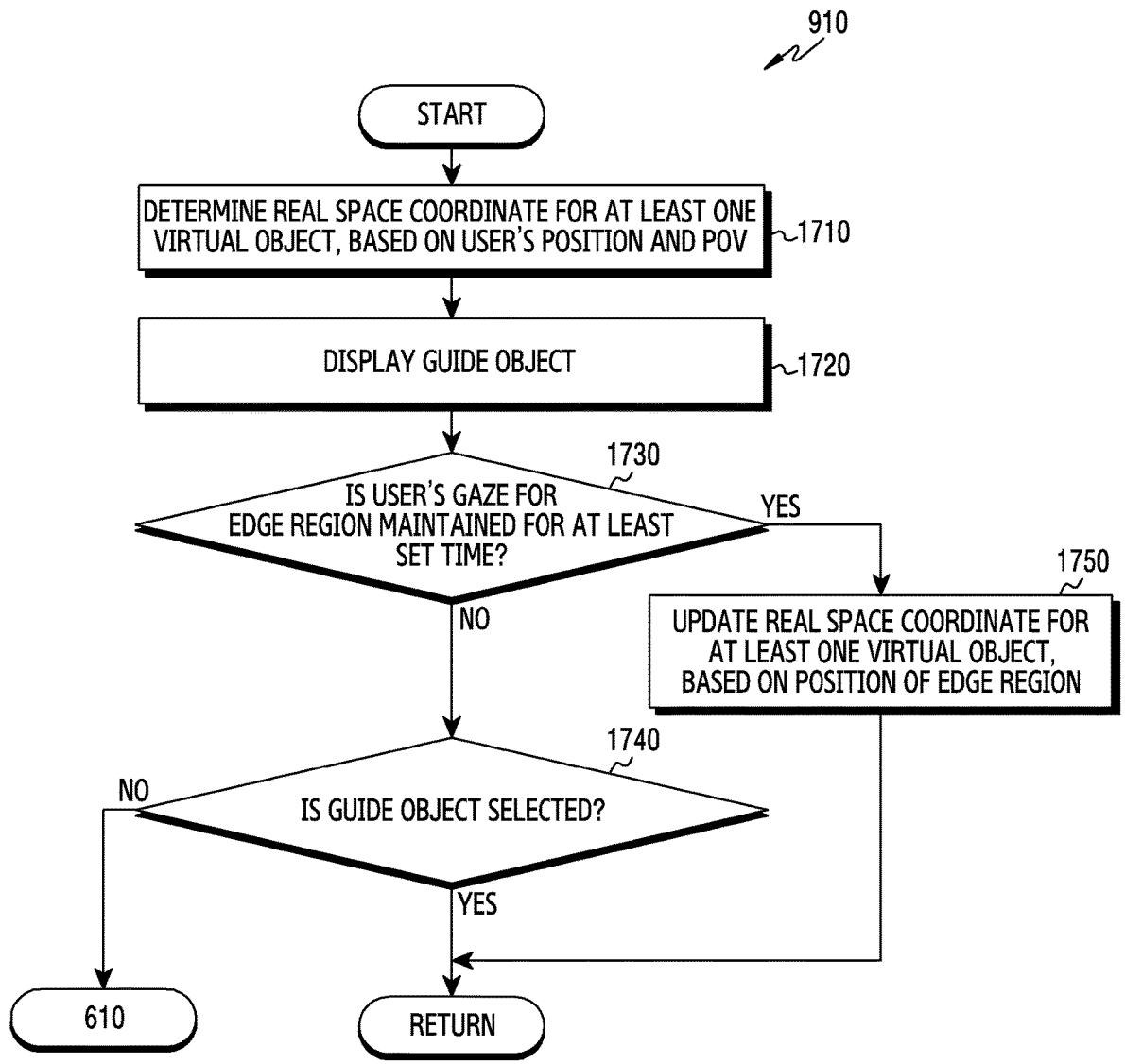
FIG. 17 is a flowchart illustrating an example operation of an electronic device for determining a real space coordinate corresponding to at least one virtual object according to various embodiments of the disclosure.

FIG. 17 is a flowchart illustrating an example operation of an electronic device for determining a real space coordinate corresponding to at least one virtual object according to various embodiments of the disclosure.

The flowchart of FIG. 17 may, for example, be a detailed flowchart illustrating the operation 910 of FIG. 9.

Figure 18A:
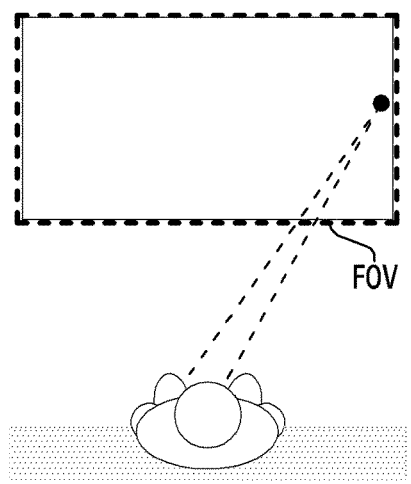
FIGS. 18A, 18B and 18C are diagrams illustrating an example operation of an electronic device for determining a real space coordinate corresponding to at least one virtual object, based on a user's gaze input, according to various embodiments of the disclosure.

Operations disclosed in FIG. 17 may be performed when a first user input is a gaze input for gazing a designated portion (or a designated region) of a screen. Referring to FIG. 18A, the first user input may be a gaze input for gazing a right edge (or a right edge region) of a screen for a designated time (e.g., 1.5 seconds).

In an embodiment, in operation 1710, the processor 510 may determine a real space coordinate corresponding to at least one virtual object previously displayed on the display 520 in a first display mode, based on a user's position and a user's POV. For example, if a real space coordinate corresponding to the user's position is (x0, y0, z0) and a real space coordinate corresponding to a position at which a virtual object A in the screen is previously displayed in the first display mode is (x1, y1, z1), a real space coordinate corresponding to the virtual object A may be determined to (xa, ya, za). (xa, ya, za) may be a coordinate of a point obtained by internally dividing (x0, y0, z0) and (x1, y1, z1) by a designated ratio.

Figure 18B:
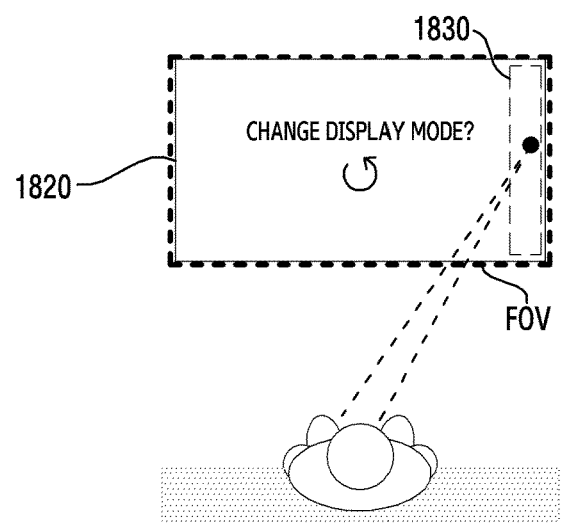
Figure 18C:
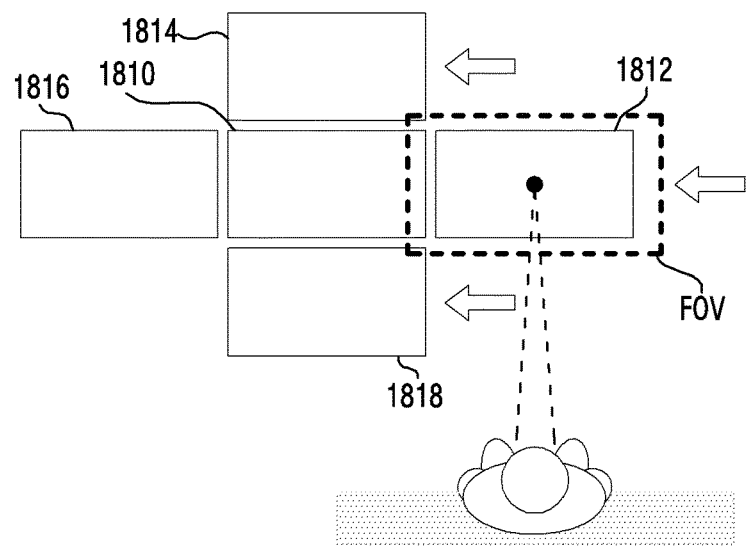

In an embodiment, in operation 1720, the processor 510 may display a guide object. Referring to FIG. 18B, the processor 510 may display a guide object 1820 for guiding a user to switch a display mode of at least one virtual object, or for informing the user that the display mode will be switched soon. The processor 510 may display the guide object based on any one of the first display mode and a second display mode.

In an embodiment, in operation 1730, the processor 510 may identify whether a user's gaze for an edge region (or an edge) is maintained for at least a set time. Referring to FIG. 18B, after the guide object 1820 is displayed, the processor 510 may identify whether a user's gaze for a right edge region 1830 related to the first user input is maintained for at least the set time.

In an embodiment, if the user's gaze for the edge region is not maintained for at least the set time (NO in operation 1730), in operation 1740, the processor 510 may identify whether the guide object 1820 is selected. For example, the processor 510 may detect a user's gesture for selecting the guide object 1820, or may identify whether the user's gaze for the guide object 1820 is maintained for at least the set time.

In an embodiment, if the guide object 1820 is not selected (NO in operation 1740), the processor 510 may proceed to operation 610. For example, if a user's intention for changing the display mode is not doubly confirmed, a display mode of at least one virtual object may not be changed to the second display mode but may be maintained as the first display mode.

According to an embodiment, if the guide object 1820 is selected (YES in operation 1740), the processor 510 may proceed to the operation 920. Since the user's intention for changing the display mode is double confirmed, the processor 510 may perform the operation 920, based on the real space coordinate determined in operation 1710.

In an embodiment, if the user's gaze for the edge region is maintained for at least the set time (YES in operation 1730), in operation 1750, the processor 510 may update the real space coordinate for the at least one virtual object, based on a position of the edge region. For example, if the user's gaze for the edge region is persistently maintained even if the guide object 1820 is displayed, it is determined that the user wants to see, at a front side, a different screen (e.g., the second screen 1612 of FIG. 16) currently not displayed on the display, and the processor 510 may update a real space coordinate of at least one virtual object (or a virtual object included in the different screen not currently displayed on the display). For example, if the user's gaze for the right edge region 1830 is maintained for at least the set time, the processor 510 may update the real space coordinate of the at least one virtual object so that at least one virtual object (or the first screen 1810 including at least one virtual object) is viewed at a left side rather than a front side within the user's view and the second screen 1812 located at the right of the first screen 1810 among the screens 1812, 1814, 1816, 1818 is viewed at the front side within the user's view. For example, the processor 510 may update the real space coordinate of the at least one virtual object by subtracting a specific value from an x-coordinate of the real space coordinate of the at least one virtual object (e.g., (xa, ya, za) is updated to (xa-k, ya, za)). After updating the real space coordinate of the at least one virtual object, the processor 510 may perform the operation 920. The processor 510 may perform the operation 920 using the updated real space coordinate.

Figure 19:
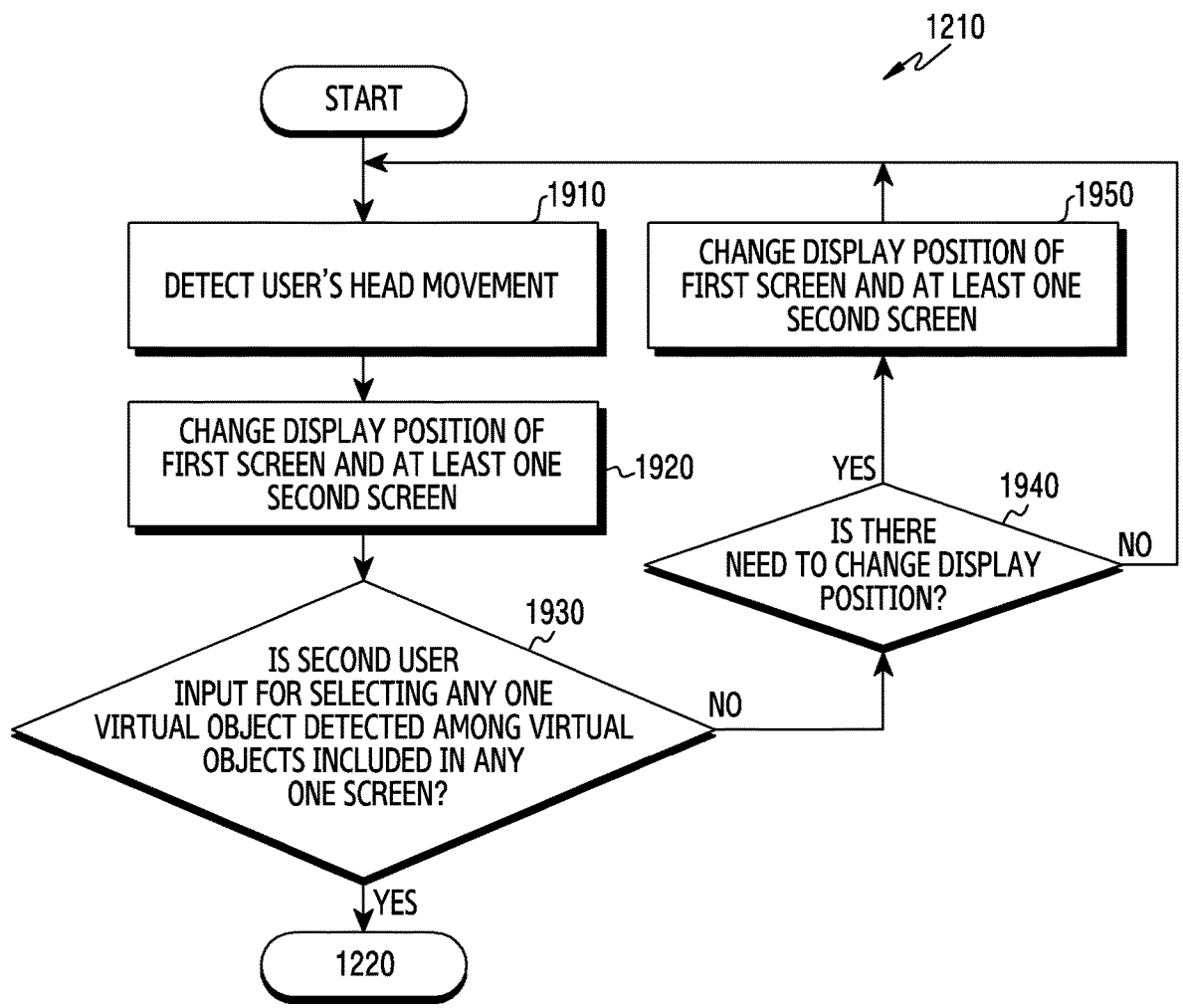
FIG. 19 is a flowchart illustrating an example operation of an electronic device for receiving a second user input for selecting any one virtual object according to various embodiments of the disclosure.

FIG. 19 is a flowchart illustrating an example operation of an electronic device for receiving a second user input for selecting any one virtual object according to various embodiments of the disclosure.

The flowchart of FIG. 19 may, for example, be a detailed flowchart illustrating the operation 1210 of FIG. 12.

Operations disclosed in FIG. 19 may be performed in a state where at least part of at least one second screen is displayed on a first screen and in the vicinity of the first screen.

In an embodiment, in operation 1910, the processor 510 may detect a user's head movement. The processor 510 may detect the user's head movement (e.g., a movement degree or a movement direction) using sensor information of a first sensor which detects a movement of the electronic device 200 corresponding to the user's head movement.

In an embodiment, in operation 1920, the processor 510 may change a display position of the first screen and at least one second screen. The processor 510 may change the display position of the first screen and at least one second screen based on the detected user's head movement. For example, if the user moves the head to the right by at least a designated value, the processor 510 may move the first screen located at a center of the screen to a left side of the screen (accordingly to a degree of the head movement, at least part of the first screen may not be displayed on the screen), and may move the second screen located at a right side of the screen to the center of the screen. In operation 1920, a real space coordinate corresponding to the first screen and at least one second screen may not be changed. For example, the change of the display position in operation 1920 may imply a change of a position at which at least one screen corresponding to a fixed real space coordinate is displayed on the screen according to the user's head movement.

Although not shown, in operation 1920, the real space coordinate corresponding to the first screen and at least one second screen may be changed. For example, if a movement degree (e.g., a rotation angle) by which the user turns the head to the left is greater than or equal to a designated value and/or if a movement speed is greater than or equal to a designated value, the real space coordinate corresponding to the first screen and at least one second screen may be changed so that the second screen located at the left side of the first screen is located at the center of the screen.

Figure 20A:
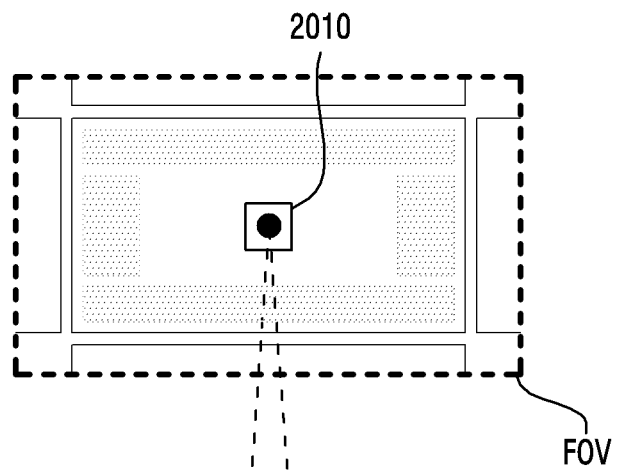
FIGS. 20A and 20B are diagrams illustrating an example second user input for selecting any one virtual object according to various embodiments of the disclosure.
Figure 20B:
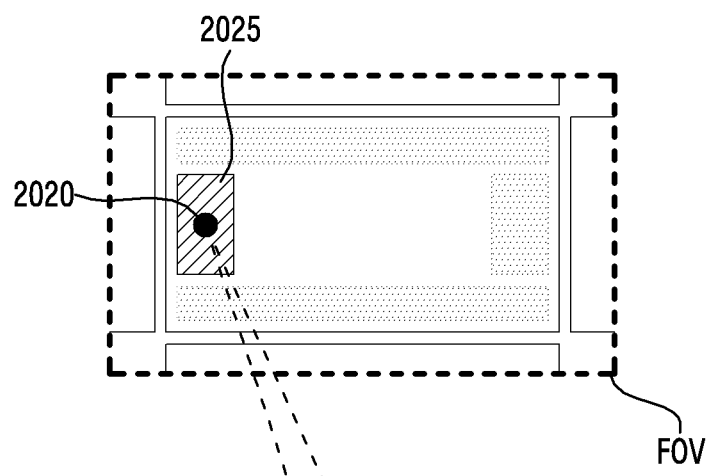

In an embodiment, in operation 1930, the processor 510 may identify whether the second user input is detected to select any one virtual object from among virtual objects included in any one screen. For example, the processor 510 may identify whether a gaze input for gazing any one virtual object for at least a designated time is detected. The processor 510 may detect the gaze input for gazing any one virtual object for at least the designated time as the second user input, using sensor information of a second sensor (e.g., a pupil tracking camera) for detecting a movement of a user's pupil. Upon detecting the gaze input for gazing any one virtual object for at least the designated time, the processor 510 may provide a graphic effect to the virtual object. For example, referring to FIG. 20A, the processor 510 may not provide an additional graphic effect upon detecting a gaze input for gazing a virtual object A 2010 for less than or equal to a designated time. Referring to FIG. 20B, upon detecting a gaze input for gazing a virtual object B 2020 for at least the designated time, the processor 510 may provide an additional graphic effect (e.g., adding of designated color, or a highlight effect such as a hatched pattern) to a designated region 2025 including the virtual object B 2020.

Upon detecting the second user input for selecting any one virtual object, the processor 510 may perform operation 1220. For example, the processor 510 may perform a function corresponding to the selected virtual object.

Upon not detecting the second user input for selecting any one virtual object, the processor 510 may perform operation 1940. For example, the processor 510 may identify whether there is a need to change a display position of the first screen and at least one second screen. In an embodiment, the processor 510 may identify whether there is a need to change a real space coordinate corresponding to the first screen and the at least one second screen.

For example, upon detecting a user input for gazing a specific region of a screen for at least a designated time, if the specific region of the screen is one of four edge regions corresponding to four directions (up, down, left, right) and if another screen is additionally present in the specific region of the screen, the processor 510 may determine that there is a need to change the display position of the first screen and at least one second screen.

For example, upon detecting the user input for gazing the specific region of the screen for at least the designated time, if the virtual object is not included in the specific region of the screen and if the virtual object is located within a designated distance from the specific region of the screen, the processor 510 may determine that there is a need to change the display position of the first screen and at least one second screen.

In an embodiment, in operation 1950, the processor 510 may change the display position of the first screen and at least one second screen.

Figure 21A:
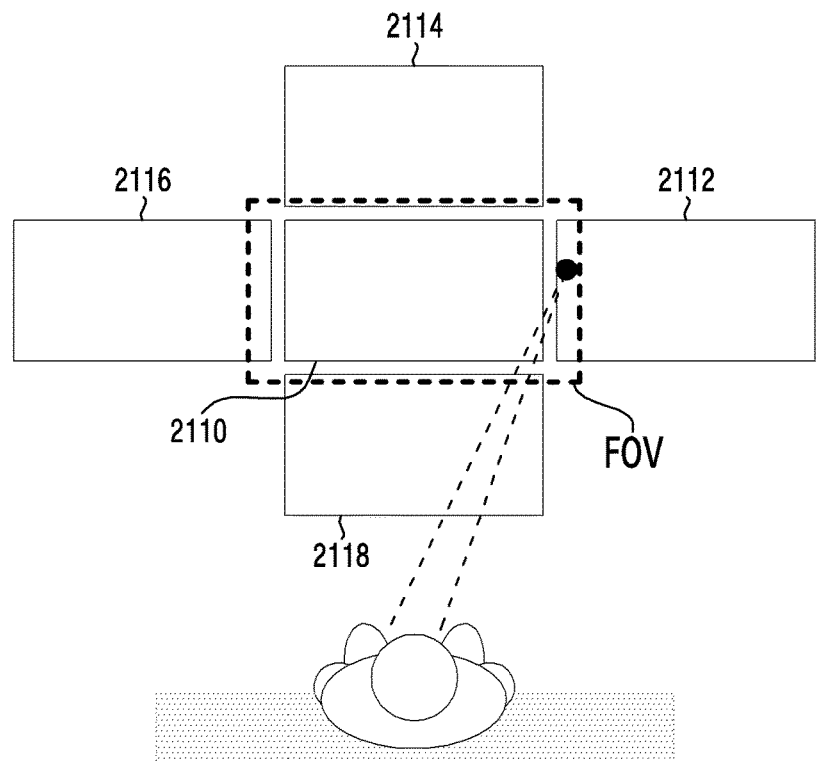
FIGS. 21A and 21B are diagrams illustrating an example operation of an electronic device for changing a display position of a plurality of screens according to various embodiments of the disclosure.

For example, referring to FIG. 21A, upon detecting the user input for gazing the specific region of the screen for at least the designated time, if the specific region of the screen is a right edge region corresponding to a right direction and a different screen (e.g., a second screen 2112) is additionally present at a right side of the right edge region, the processor 510 may change a real space coordinate corresponding to a first screen 2110 and at least one of second screens 2112, 2114, 2116, and 2118, so that the second screen 2112 is located at a front side within a user's view.

Figure 21B:
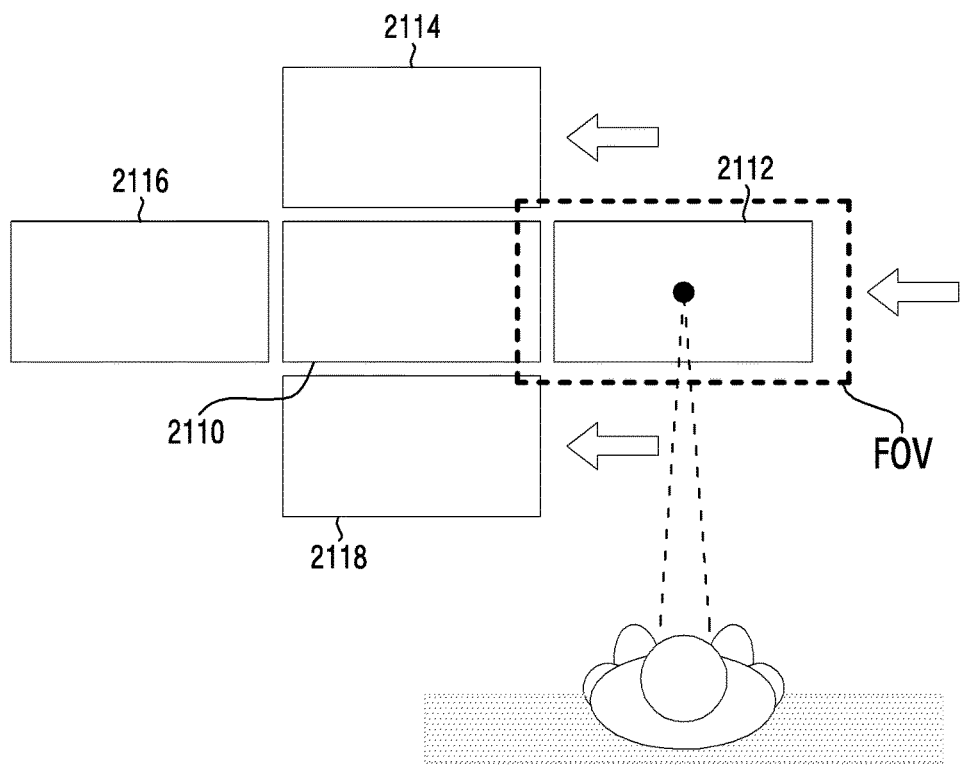

For example, referring to FIG. 21B, the real space coordinate corresponding to the first screen and at least one second screen may be changed so that the first screen and the at least one second screen are equally moved in parallel in a left direction perpendicular to a direction of a user's view on a real space. The processor 510 may change the display position of the first screen and at least one second screen based on the changed real space coordinate.

For another example, upon detecting the user input for gazing the specific region of the screen for at least the designated time, if the virtual object is not included in the specific region of the screen and if a virtual object A (not shown) is located within a designated distance from the specific region of the screen, the processor 510 may change the real space coordinate corresponding to the first screen 2110, so that a screen (e.g., the first screen 2110) including the virtual object A is displayed by enlarging a size thereof within the user's view. For example, the real space coordinate may be changed, so that the first screen 2110 is moved in parallel in a user direction (or in a direction opposite to the user direction) on the real space. In this case, a real space coordinate corresponding to not only the first screen 2110 but also the at least one of the second screens 2112, 2114, 2116, and 2118 may be changed. The display position within the first screen may be changed based on the changed real space coordinate.

Accordingly, the processor 510 may provide the user with a playful experience of moving the virtual object with only an eye movement by changing the real space coordinate corresponding to the at least one virtual object (or a screen including the at least one virtual object).

In an embodiment, the processor 510 may perform operation 1910 after operation 1950. In another embodiment, the processor 510 may proceed to operation 1930 after operation 1950.

Figure 22A:
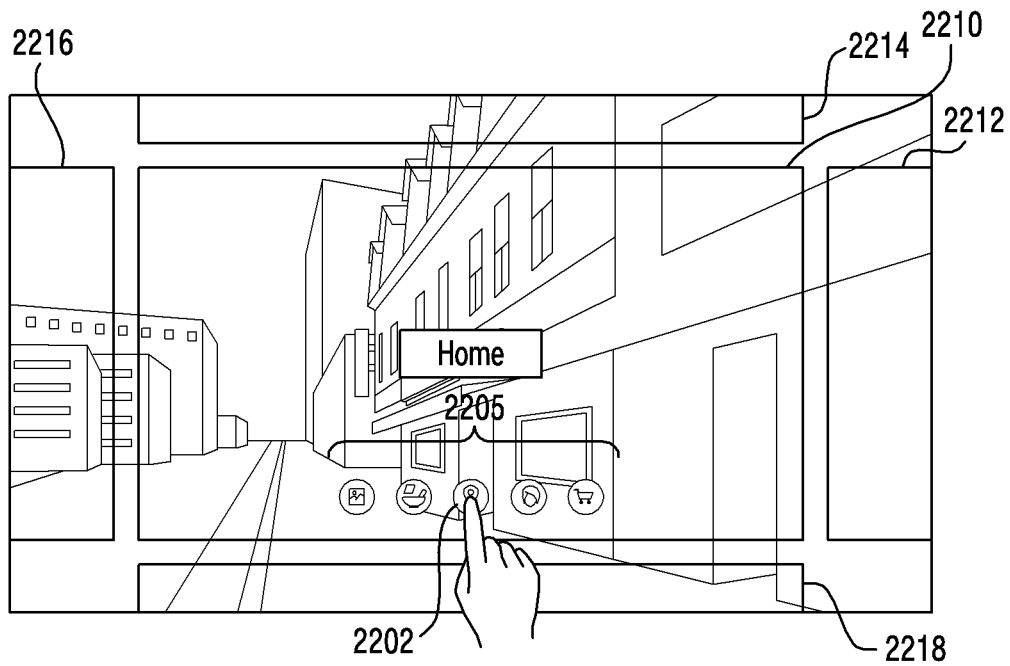
FIGS. 22A and 22B are diagrams illustrating an example operation of an electronic device for performing a function corresponding to a selected virtual object according to various embodiments of the disclosure.
Figure 22B:
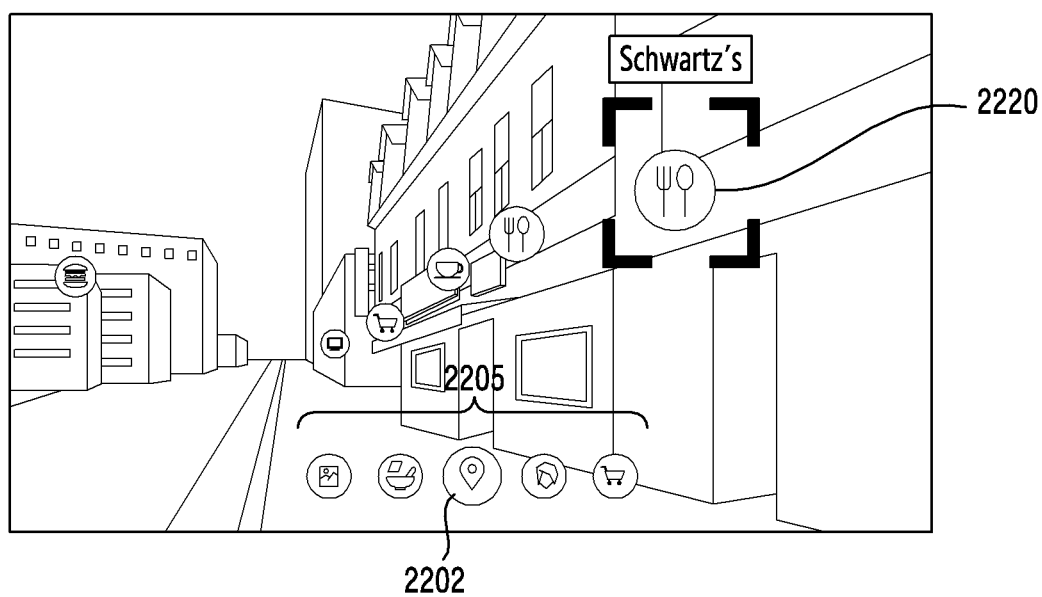

FIGS. 22A and 22B are diagrams illustrating an example operation of an electronic device for performing a function corresponding to a selected virtual object according to various embodiments of the disclosure.

Referring to FIG. 22A, one first screen 2210 and part of four second screens 2212, 2214, 2216, and 2218 located in the vicinity of the first screen 2210 may be displayed on a screen based on a second display mode. The first screen 2210 may include a plurality of virtual objects 2205 (e.g., a plurality of virtual icons). In an embodiment, the plurality of virtual objects 2205 may be virtual objects previously displayed on the screen when a first user input is received. In another embodiment, the plurality of virtual objects 2205 may be virtual objects previously not displayed on the screen when the first user input is received.

In an embodiment, the plurality of virtual objects 2205 included in the first screen 2210 may correspond to respective different functions. For example, the virtual object A 2202 included in the first screen 2210 may correspond to a Point Of Interest (POI) browsing function. The POI browsing function may be a function for identifying (or searching) a point of interest on a real space of a current position (or associated with the current position or a user's POV), and for displaying on a screen a virtual object including information corresponding to the point of interest on the identified real space. Referring to FIG. 22A, the processor 510 may receive a user's gesture for selecting the virtual object A 2202 corresponding to the POI browsing function from among the plurality of objects 2205.

In an embodiment, the point of interest on the real space of the current position (or associated with the current position or the user's POV) may be identified. Referring to FIG. 22B, the processor 510 may display on the screen a virtual object (e.g., a virtual object B 2220) including information corresponding to the identified point of interest on the real space (e.g., business information of a shop).

In an embodiment, upon selecting the virtual object A 2202, the processor 510 may restrict the displaying of the first screen 2210 and the four second screens 2212, 2214, 2216, and 2218 on the screen, and may differently display the selected virtual object A 2202 and unselected virtual objects while maintaining the displaying of the plurality of virtual objects 2205 previously included in the first screen 2210.

In an embodiment, the processor 510 may use a different display mode according to an attribute of the virtual object. For example, the processor 510 may display the plurality of virtual objects 2205 previously included in the first screen 2210, based on a first display mode. For example, even if a user's POV changes as the user walks forward, the plurality of virtual objects 2205 previously included in the first screen 2210 may be displayed at a fixed position of the screen. In addition, the processor 510 may display virtual objects (e.g., the virtual object B 2220) including information corresponding to the identified point of interest on the real space, based on the second display mode. For example, if the user's POV changes as the user walks forward, the processor 510 may no longer display on the screen the virtual object previously displayed on the screen, or may newly display on the screen the virtual object previously not displayed on the screen.

In an embodiment, the processor 510 may receive a user input for selecting the virtual object including information corresponding to the identified point of interest on the real space (e.g., business information of a shop). For example, upon receiving a user input for gazing a virtual object corresponding to a specific shop for at least a designated time, the processor 510 may provide a user interface for receiving a user comment for the specific shop while providing detailed information on the specific shop. The processor 510 may store the received user comment in accordance with position information of the specific shop.

FIGS. 23A, 23B, 23C and 23D are diagrams illustrating an example operation of an electronic device for selecting any one virtual object and performing a function corresponding to the selected virtual object according to various embodiments of the disclosure.

Figure 23A:
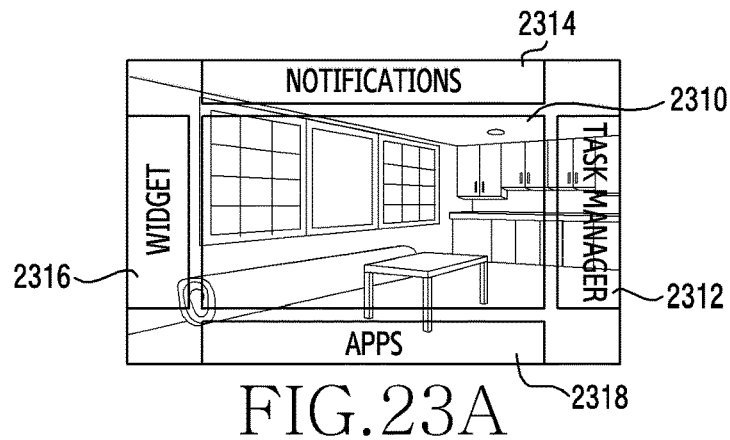
FIGS. 23A, 23B, 23C and 23D are diagrams illustrating an example operation of an electronic device for performing a function corresponding to a selected virtual object according to various embodiments of the disclosure.

Referring to FIG. 23A, the processor 510 may display a first screen 2310 and at least part of four second screens 2312, 2314, 2316, 2318 (which may be referred to hereinafter as second screens 2312 to 2318). Each of the at least part of the four second screens 2312 to 2318 may include information (e.g., text information) indicating at least one of an attribute, character, and display form of a virtual object included in a corresponding screen. The four second screens may correspond to a designated real space coordinate range.

The processor 510 may receive a user input for displaying one second screen.

In an embodiment, the processor 510 may receive a user input irrespective of a change of a real space coordinate corresponding to the second screen, as a user input for displaying one second screen. For example, the processor 510 may receive a user's head movement (e.g., a movement of a user who turns the user's head to the left).

In another embodiment, the processor 510 may receive a user input related to a change of the real space coordinate corresponding to the second screen, as the user input for displaying one second screen. For example, the processor 510 may receive a user input including a designated voice keyword "widget". The processor 510 may change a real space coordinate of the first screen 2310 and at least one additional screens 2312 to 2318, so that the second screen 2316 corresponding to the designated voice keyword "widget" is visible at a front side within a user's view.

Figure 23B:
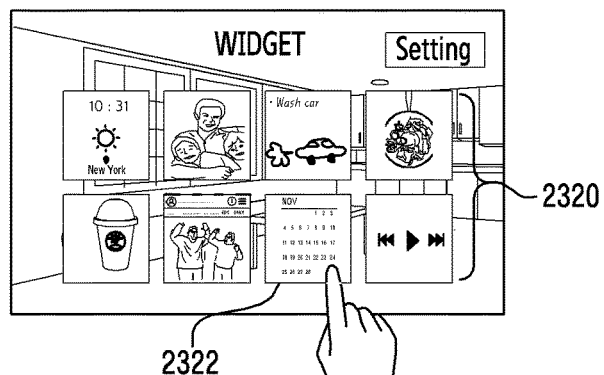

In an embodiment, the processor 510 may receive a user input for selecting any one virtual object from among a plurality of virtual objects having a widget form and included in the second screen 2316. The user input for selecting any one virtual object may be any one of a gaze input and a gesture input. Referring to FIG. 23B, the processor 510 may receive a user gesture for selecting a virtual object A 2322 from among plurality of virtual objects 2320 having a widget form and included in the second screen 2316.

Figure 23C:
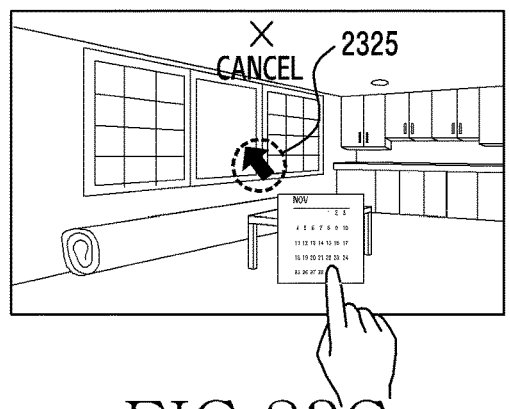
Figure 23D:
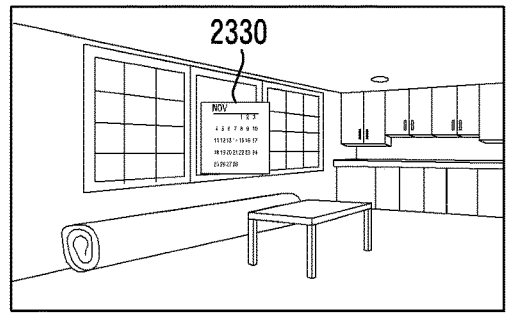

In an embodiment, the processor 510 may map the selected virtual object A 2322 to a specific real object. Referring to FIG. 23C, while the user gesture for selecting the virtual object A 2322 is maintained, the processor 510 may display an additional virtual object B 2325 for guiding the specific real object to be mapped to the virtual object A 2322.

In an embodiment, upon releasing the user gesture for selecting the virtual object A 2322, the processor 510 may map the virtual object A 2322 to a real object corresponding to a release time of the user gesture. Referring to FIG. 24D, the processor 510 may map the virtual object A 2322 to a window which is a real object, and may display the virtual object A 2330 mapped to the window.

Figure 24A:
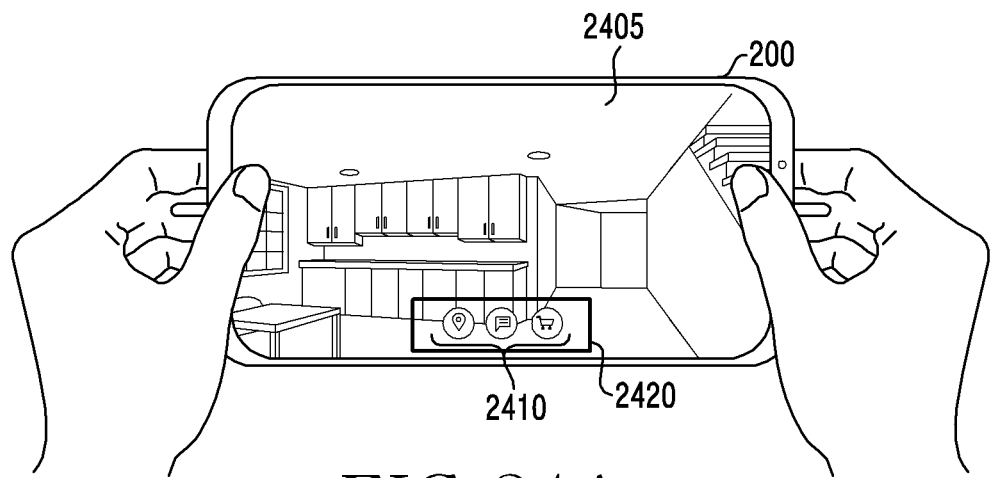
FIGS. 24A, 24B and 24C are diagrams illustrating an example in which an electronic device is a mobile portable terminal according to various embodiments of the disclosure.
Figure 24B:
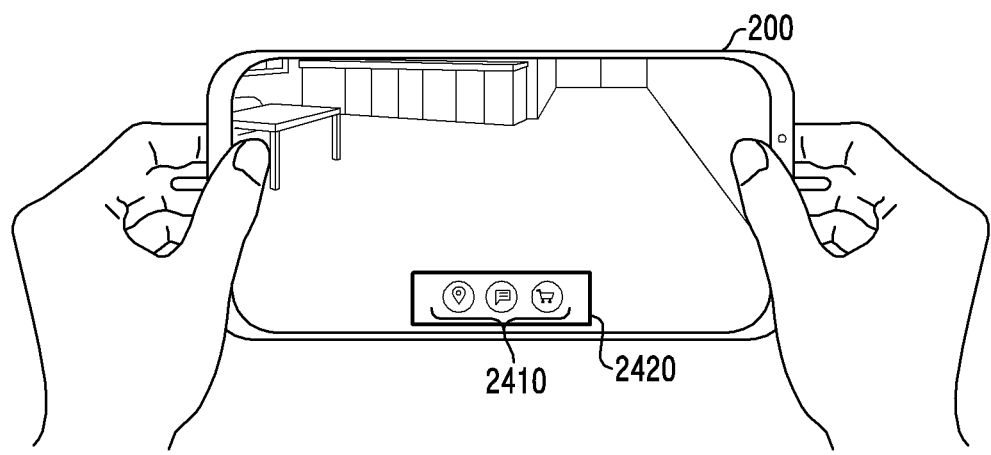
Figure 24C:
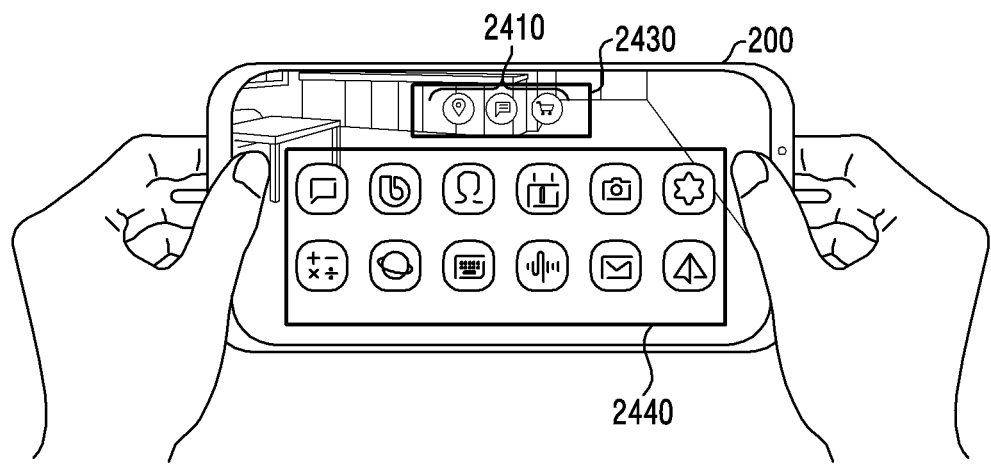

FIGS. 24A, 24B and 24C are diagrams illustrating an example where an electronic device is a mobile portable terminal according to various embodiments of the disclosure.

Referring to FIG. 24A, 24B and FIG. 24C, embodiments disclosed below are for a case where the electronic device 200 is a mobile portable terminal.

Referring to FIG. 24A and FIG. 24B, the processor 510 may display at least one virtual object 2410 in a first display mode by being superimposed on real object images obtained through a camera module (not shown, e.g., the camera module 560 of FIG. 6). The first display mode may be a display mode in which at least one virtual object is displayed at a fixed position of a screen irrespective of a user's POV. Referring to FIG. 24A, at least one virtual object 2410 may be displayed in a first region 2420 of screen 2405. Referring to FIG. 24B, the at least one virtual object 2410 may be displayed fixedly in the first region 2420 even if a real object image displayed on a screen is changed when a user raises the electronic device 200 upward.

Referring to FIG. 24C, in response to receiving a first user input for changing a display mode, the processor 510 may display in a second display mode the at least one virtual object 2410 previously displayed in the first display mode. The processor 510 may determine a real space coordinate corresponding to the at least one virtual object 2410, and may display the at least one virtual object 2410 in the second display mode based on the determined real space coordinate. In an embodiment, the processor 510 may display a first screen including the at least one virtual object and at least one second screen located in the vicinity of the first screen. In another embodiment, the processor 510 may display a guide object for implicating a presence of the first screen including the at least one virtual object and another screen (e.g., the second screen).

Referring to FIG. 24C, the processor 510 may change a display position of the at least one virtual object 2410 based on a movement of the electronic device 200.

For example, upon detecting a movement in which the electronic device 200 moves downward, the processor 510 may change a display position of the at least one virtual object 2410 from a first region 2420 to a second region 2430. Upon detecting the movement in which the electronic device 200 moves downward, the processor 510 may newly display at least one virtual object 2440 previously not displayed.

For another example, upon detecting the movement in which the electronic device 200 moves downward, the processor 510 may prevent at least part of the first screen from being displayed on the screen, as a display position of a first screen including the at least one virtual object is moved. The processor 510 may newly display at least one virtual object included in a second screen located below the first screen.

Figure 25:
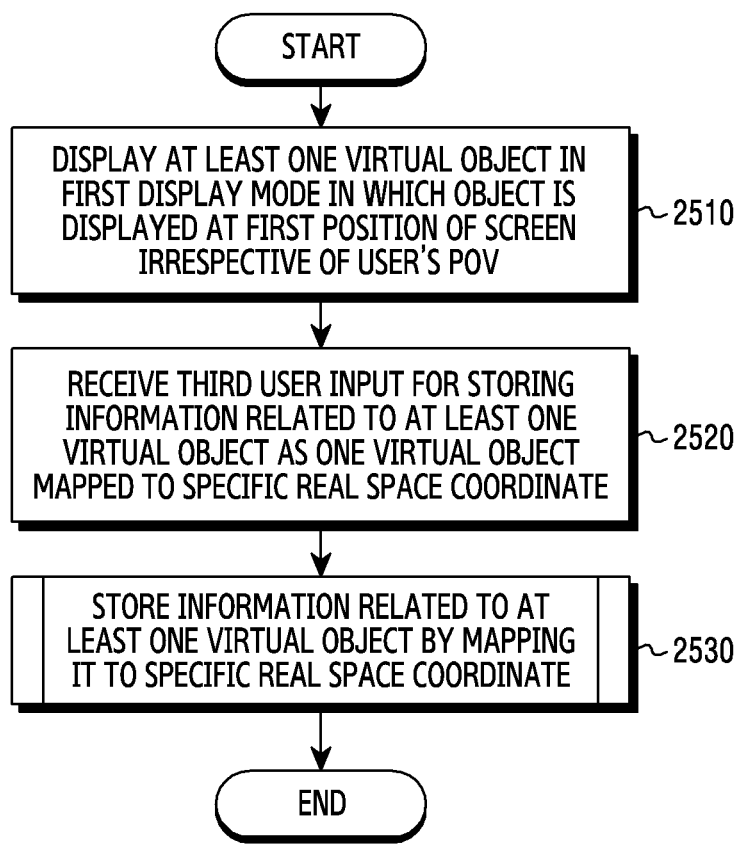
FIG. 25 is a flowchart illustrating an example operation of an electronic device for combining data related to a virtual object previously displayed in a first display mode and storing the data by converting it in a form suitable for a space according to various embodiments of the disclosure.

FIG. 25 is a flowchart illustrating an example operation of an electronic device for combining data related to a virtual object previously displayed in a first display mode and storing the data by converting it in a form suitable for a space according to various embodiments of the disclosure.

In an embodiment, operations disclosed in FIG. 25 may be performed by an electronic device (e.g., the electronic device 200 of FIG. 2) or a processor (e.g., the processor 510 of FIG. 5). Hereinafter, for convenience of description, it is disclosed that the operations disclosed in FIG. 25 are performed by the processor 510 although one skilled in the art will understand that the various operations may be performed by the electronic device 200 under control of the processor 510.

In an embodiment, in operation 2510, the processor 510 may display at least one virtual object, which is to be displayed at a fixed position of a screen irrespective of a user's POV, in the first display mode.

For example, referring to FIG. 26A and FIG. 26B, in response to receiving a user input for activating a workout application, the processor 510 may provide the user with workout information (e.g., a cumulative workout time, a current movement speed, calorie consumption, and if a competitor exists, information on the competitor) provided from the workout application in a virtual object form. In the providing of the workout information in the virtual object form, the processor 510 may display at least one virtual object in the first display mode. For example, the processor 510 may display a virtual object A 2610 indicating information on the cumulative workout time, cumulative workout distance, and calorie consumption and a virtual object B 2615 indicating information on a rival fixedly in a designated region of a screen.

In an embodiment, in operation 2520, the processor 510 may receive a third user input for storing information related to the at least one virtual object as one virtual object mapped to a specific real space coordinate (e.g., a real space coordinate corresponding to a current position or a real space coordinate corresponding to a landmark located within a designated distance from the current position).

In an embodiment, the third user input may be a user input which is the same type as a first user input or a second user input. For example, the third user input may be at least one of an input related to a user interface (e.g., the user interface 550 of FIG. 5), a gesture input for performing a predetermined motion, a voice input including a predetermined voice keyword "store here", and a gaze input for gazing a designated portion of a screen for at least a designated time. For example, referring to FIG. 26D and FIG. 26E, the processor 510 may display a virtual object C 2620 for storing the at least one virtual object (or information related to the at least one virtual object, e.g., a cumulative workout time, etc.) as one virtual object mapped to a specific real space coordinate, and the processor 510 may receive a user gesture for selecting the virtual object C 2620.

In an embodiment, before the third user input is received, the processor 510 may receive a user input (e.g., the first user input) for changing the display mode. For example, referring to FIG. 26C and FIG. 26D, upon receiving the first user input, the processor 510 may display the at least one virtual object 2620 (and/or newly generated at least one virtual object (e.g., the virtual object D 2640)) in a second display mode. In an embodiment, upon changing the display mode from the first display mode to the second display mode, the processor 510 may change a shape of a cursor. For example, referring to FIG. 26C and FIG. 26D, the processor 510 may change the shape of the cursor from an inverted triangle to a cross shape. Upon displaying at least one virtual object based on the second display mode, the processor 510 may change the display of the at least one virtual object, based on a user's movement. For example, referring to FIG. 26D and FIG. 26E, if the user moves forward, the processor 510 may display the at least one virtual object (e.g., the virtual object C 2620) by relatively enlarging a size thereof. For another example, referring to FIG. 26D and FIG. 26E, when the user moves to the right, the processor 510 may display the at least one virtual object (e.g., the virtual object C 2620) by moving it relatively to the left on the screen. In this case, the user may select a desired virtual object by locating the virtual object (e.g., the virtual object C 2620) at a cursor 2622 without having to move the cursor 2622.

In an embodiment, in operation 2530, the processor 510 may store information related to the at least one virtual object by mapping it to a specific real space coordinate. For example, the processor 510 may generate one virtual object including information related to the at least one virtual object (e.g., a cumulative workout time, a cumulative workout distance, calorie consumption, rival information, etc.), and may store the generated virtual object by mapping it to the specific real space coordinate.

In an embodiment, referring to FIG. 26F, the processor 510 may display one virtual object mapped to the specific real space coordinate in the second display mode. The processor 510 may display the one virtual object mapped to the specific real space coordinate in the second display mode, as if a virtual object including information corresponding to a point of interest on a real space is displayed.

According to an embodiment, if a position of the electronic device 200 is within a designated distance from the specific real space coordinate, the processor 510 may display on the screen the one virtual object mapped to the specific real space coordinate.

For example, referring to FIG. 26G, while at least one virtual object is displayed in the first display mode (e.g., while the virtual object E 2650 is displayed in the first display mode), if the position of the electronic device 200 is within a designated distance from the specific real space coordinate, the processor 510 may display one virtual object 2630 mapped to the specific real space coordinate on the screen based on any one display mode, e.g., the first display mode or the second display mode.

For another example, while at least one virtual object is displayed in the second display mode, if the position of the electronic device 200 is within a designated distance from the specific real space coordinate, the processor 510 may display the one virtual object 2630 mapped to the specific real space coordinate on the screen based on one display mode, i.e., the first display mode or the second display mode.

Figure 27:
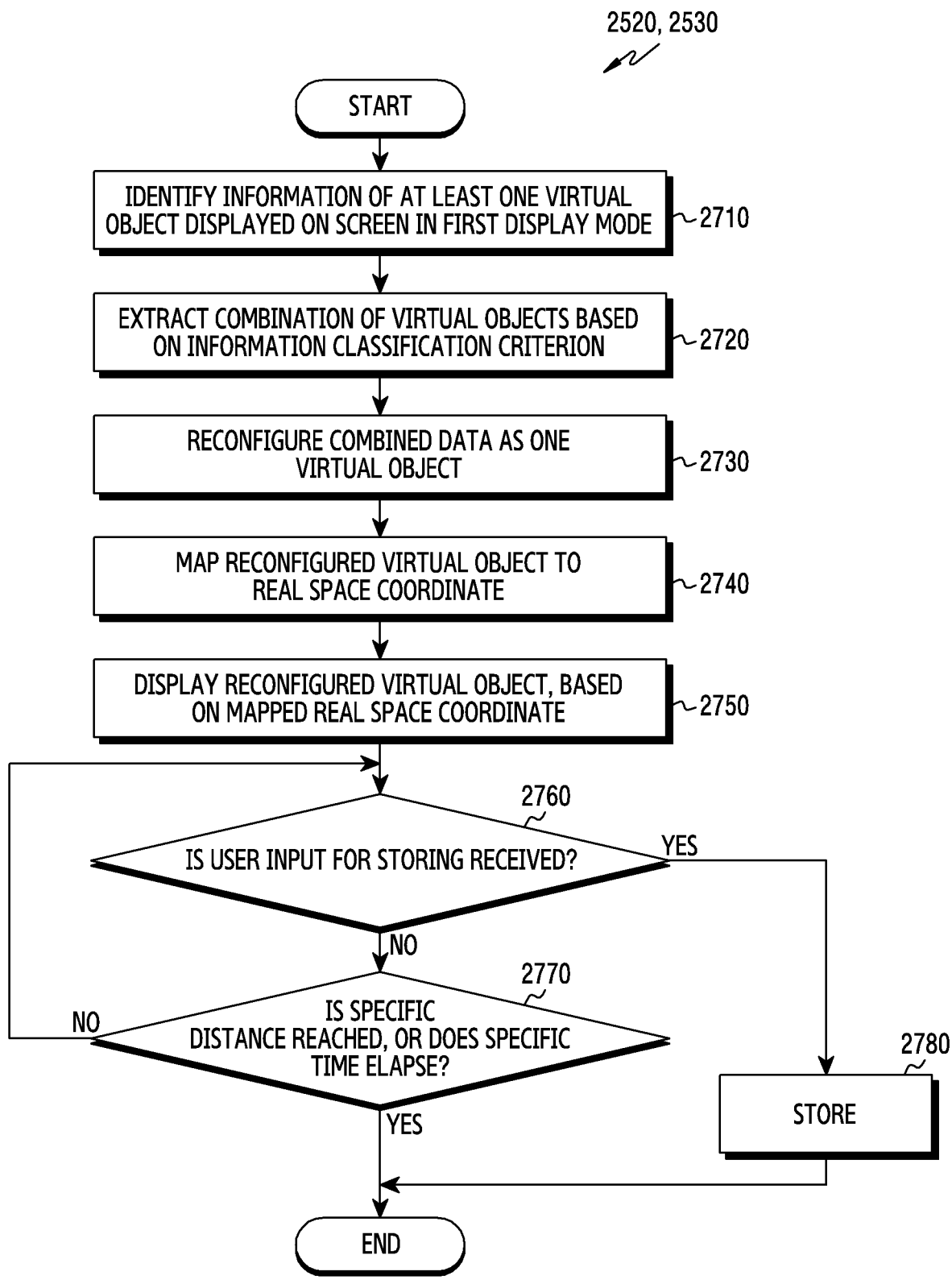
FIG. 27 is a flowchart illustrating an example operation of an electronic device for storing at least one virtual object by mapping it to a specific real space coordinate according to various embodiments of the disclosure.

FIG. 27 is a flowchart illustrating an example operation of an electronic device for storing at least one virtual object by mapping it to a specific real space coordinate according to various embodiments of the disclosure.

The flowchart of FIG. 27 may, for example, be a detailed flowchart illustrating the operations 2520 and 2530 of FIG. 25.

In an embodiment, in operation 2710, the processor 510 may identify information of at least one virtual object. For example, referring to FIG. 26B, the processor 510 may identify information of all virtual objects displayed on a screen in a first display mode.

In an embodiment, in operation 2720, the processor 510 may extract (or determine) a combination of virtual objects based on an information classification criterion. In an embodiment, the processor 510 may classify all virtual objects displayed in the first display mode according to a predetermined criterion using the identified information of at least one virtual object, and may determine a combination based thereon. For example, the processor 510 may classify all virtual objects, based on at least one of application information used in the generation of the virtual object, a generation time of the virtual object, and an attribute of data related to the virtual object (e.g., whether it is information corresponding to a specific time or information corresponding to a specific time duration). The processor 510 may determine at least one object classified into the same category among the all virtual objects as a combination of a virtual object to be reconfigured as one virtual object. For example, the processor 510 may determine at least one virtual object generated based on the same application (e.g., a workout application) as a combination of a virtual object to be reconfigured as one virtual object.

In an embodiment, in the determining of the combination of the virtual objects, the processor 510 may use information on a combination selected by the user among a plurality of combinations and a combination (e.g., a combination used by at least a designated count) previously used frequently by the user.

In an embodiment, in operation 2730, the processor 510 may reconfigure the determined configuration of the virtual objects as one virtual object. For example, upon determining a combination of the virtual object A 2610 and the virtual object B 2615 based on a generation of a virtual object, application information used in the generation of the virtual object, and a related data attribute among the at least one virtual object, the processor 510 may reconfigure data related to the virtual object A 2610 and data related to the virtual object B 2615 as one virtual object.

In an embodiment, in operation 2740, the processor 510 may map the reconfigured virtual object to the real space coordinate. For example, the processor 510 may map the reconfigured virtual object to a real space coordinate corresponding to a position of the electronic device 200 at a time of receiving the third user input or a real space coordinate corresponding to a landmark located within a designated distance from the position.

In an embodiment, in operation 2750, the processor 510 may display the reconfigured virtual object based on the mapped real space coordinate. For example, if a distance between a coordinate corresponding to a current position of the electronic device 200 and the mapped real space coordinate and a direction in which a screen of the electronic device 200 faces (or a POV corresponding to the screen of the electronic device 200, based on the direction in which the electronic device 200 faces) satisfy a designated condition, the processor 510 may display the reconfigured virtual object on the screen. For example, if the distance between the coordinate corresponding to the current position of the electronic device 200 and the mapped real space coordinate is less than a designated distance and if the mapped real space coordinate is included in a POV corresponding to the screen of the electronic device 200, the processor 510 may display the reconfigured virtual object on the screen.

Figure 28A:
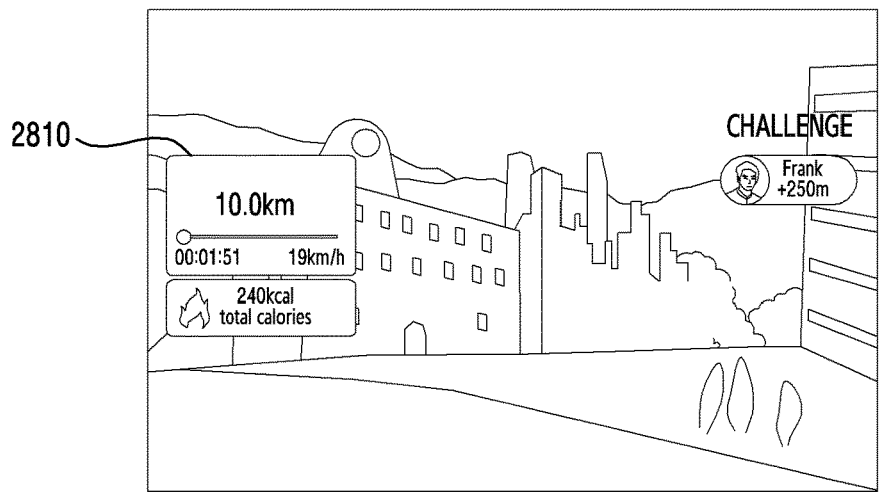
FIGS. 28A, 28B and 28C are diagrams illustrating an example operation of an electronic device for storing at least one virtual object by mapping it to a specific real space coordinate according to various embodiments of the disclosure.
Figure 28B:
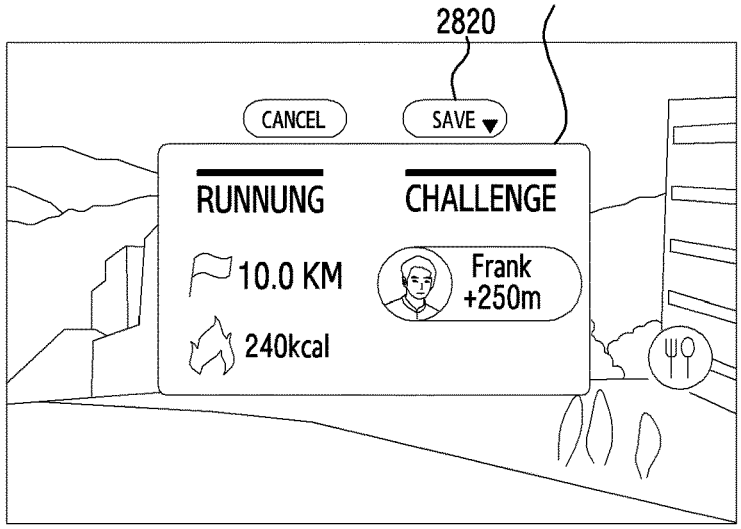

In an embodiment, in operation 2760, the processor 510 may determine whether a third user input for storing is received. The processor 510 may display an additional virtual object for receiving the third user input. For example, referring to FIG. 28B, the processor 510 may display on the screen the reconfigured virtual object 2825 and an additional virtual object 2820 for receiving the third user input.

In an embodiment, upon receiving the third user input, in operation 2780, the processor 510 may store identification information of the reconfigured virtual object in a memory (e.g., the memory 570 of FIG. 5) in accordance with the mapped real space coordinate.

In an embodiment, upon not receiving the third user input, in operation 2770, the processor 510 may determine whether a specific distance is reached or a specific time elapses. For example, the processor 510 may determine whether the specific distance is reached or the specific time elapses with respect to a time or position at which the additional virtual object 2820 for receiving the third user input is displayed on the screen, or may determine whether the specific distance is reached or the specific time elapses with respect to a time and position at which a first user input for switching the display mode from the first display mode to a second display mode is received.

In an embodiment, if the specific distance is not reached and the specific time does not elapse, operation 2760 may be performed again. For example, the processor 510 may repeatedly perform operations 2760 and 2770.

Figure 28C:
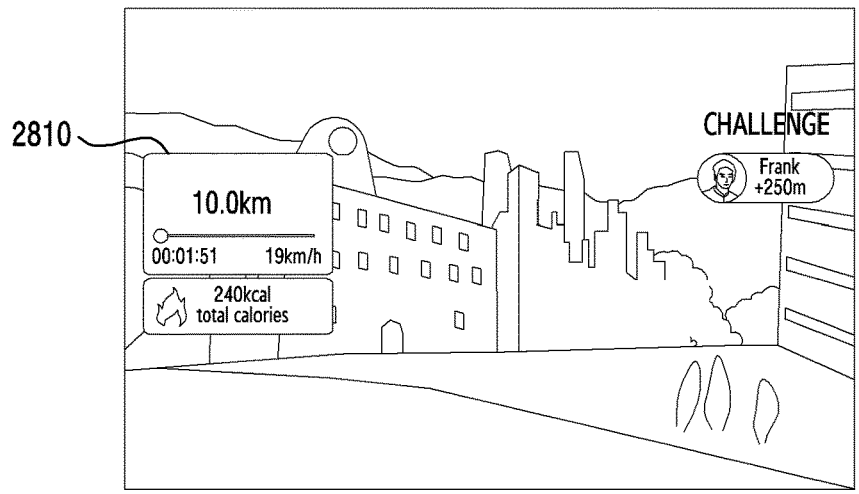
Figure 29A:
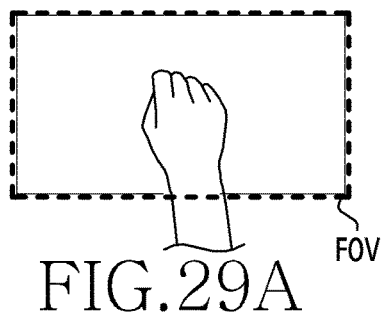
FIGS. 29A, 29B, 29C, 29D, and 29E are diagrams illustrating an example user input for returning to a first display mode from a second display mode according to various embodiments of the disclosure.
Figure 29B:
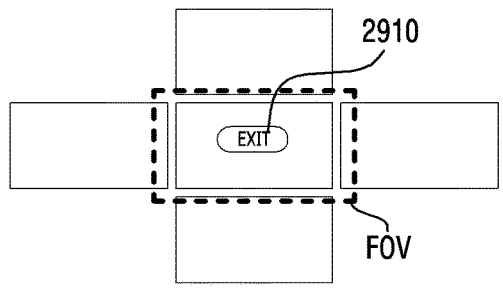
Figure 29C:
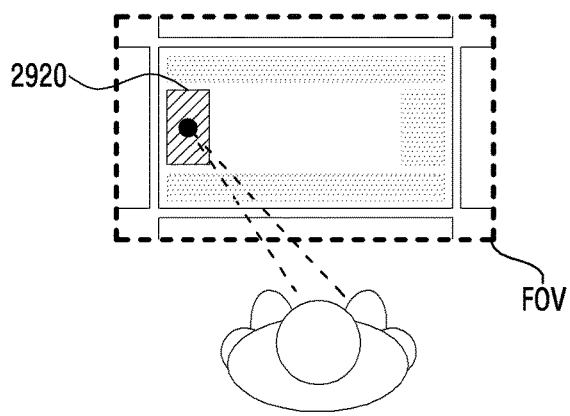
Figure 29D:
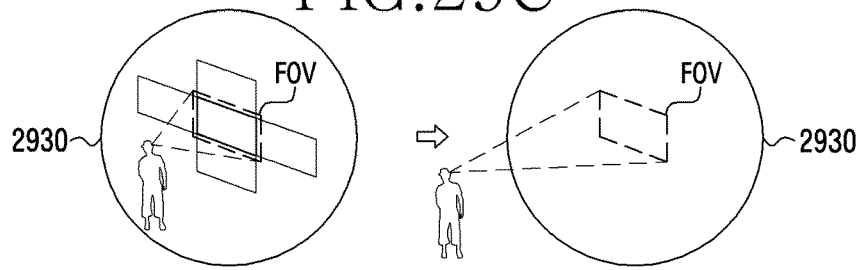
Figure 29E:
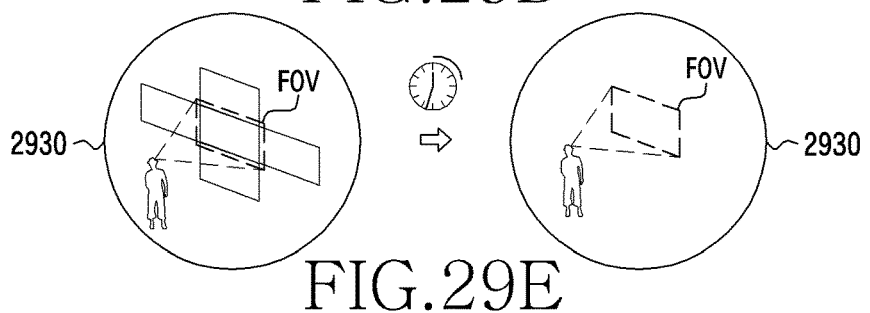

In an embodiment, when the specific distance is reached or the specific time elapses, the reconfigured virtual object may not store the reconfigured virtual object in accordance with the mapped real space coordinate (or release or delete mapping relation between the reconfigured virtual object and the real space coordinate) to return to the first display mode. For example, referring to FIG. 28C, if the third user input is not received and the specific distance is reached, the processor 510 may display the virtual object A 2810 based on the first display mode.

FIGS. 29A, 29B, 29C, 29D, and 29E are diagrams illustrating an example user input for returning to a first display mode from a second display mode according to various embodiments of the disclosure.

In an embodiment, the processor 510 may receive a fourth user input for returning to the first display mode from the second display mode. In an embodiment, the fourth user input may be a user input which is the same type as a first user input. For example, referring to FIG. 29A, the fourth user input may be a gesture input for performing a predetermined motion (e.g., a motion of grabbing at least one virtual object displayed on the screen).

In another embodiment, the fourth user input may be a selection of a user interface which clearly indicates ending of the second display mode or returning of the first display mode. In an embodiment, the user interface may be a user interface (e.g., the user interface 550) disposed to a surface of the electronic device (e.g., the electronic device 200) or may be a virtual object displayed on the screen. For example, referring to FIG. 29B, the processor 510 may receive a user input for selecting a virtual object A 2910 indicating the ending of the second display mode (e.g., a gaze input for gazing for at least a designated time)

In another embodiment, the fourth user input may be a user input for selecting a virtual object corresponding to a specific function. For example, referring to FIG. 29C, upon receiving a user input for selecting a virtual object B 2920 corresponding to the execution of the application B, the processor 510 may execute the application B and thereafter return to the first display mode even if there is no additional user input.

In another embodiment, if the user moves by at least a designated distance, the processor 510 may display at least one virtual object based on the first display mode. For example, referring to FIG. 29D, while at least one virtual object is displayed based on the second display mode, if the user moves by at least the designated distance or moves beyond a designated range 2930, the processor 510 may display the at least one virtual object based on the first display mode. The designated range 2930 may be a range within a specific distance from a real space coordinate of the at least one virtual object.

In another embodiment, if the designated time elapses without the user input, the processor 510 may display at least one virtual object based on the first display mode. For example, referring to FIG. 29E, while at least one virtual object is displayed based on the second display mode, if the designated time elapses without the user input, the processor 510 may display the at least one virtual object based on the first display mode even if the user is located within the designated range 2930.

In an embodiment, the processor 510 may display at least one virtual object or at least one screen (e.g., the first screen or the second screen) including the at least one virtual object based on the first display mode, in response to detecting the fourth user input. For example, upon detecting the fourth user input while one first screen and at least part of at least one second screen are displayed, the processor 510 may enlarge the one first screen with a designated ratio (e.g., enlarge it to a full screen), and may display at least one virtual object included in the one first screen based on the first display mode.

Figure 30:
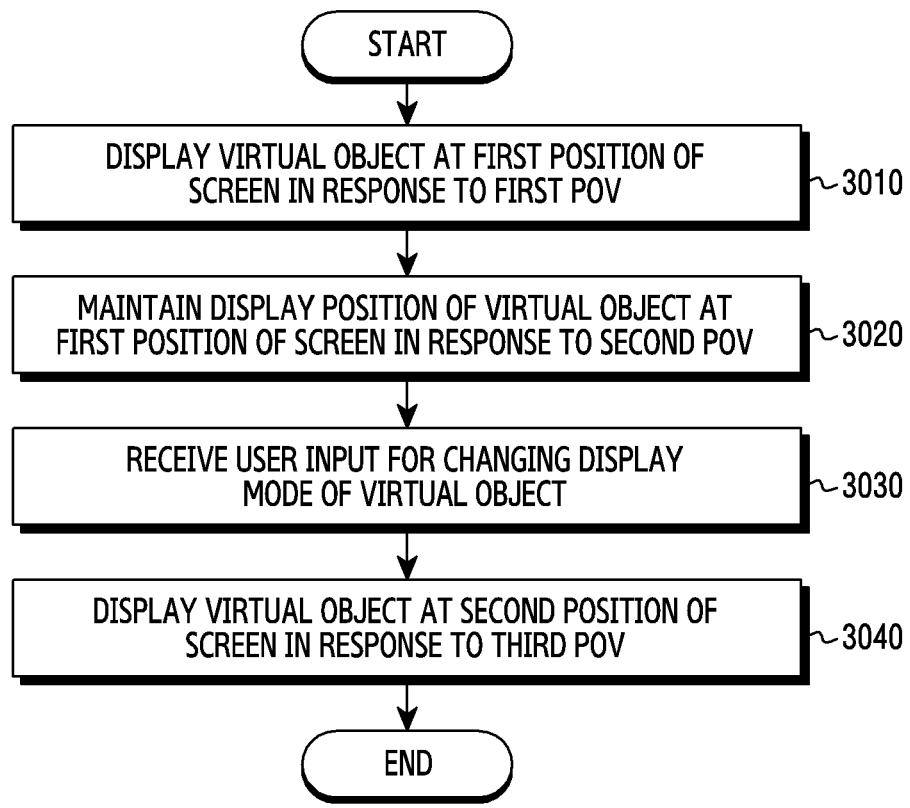
FIG. 30 is a flowchart illustrating an example operation of an electronic device for changing a display mode based on a user input according to various embodiments of the disclosure.

FIG. 30 is a flowchart illustrating an example operation of an electronic device for changing a display mode based on a user input according to various embodiments of the disclosure.

In an embodiment, operations disclosed in FIG. 30 may be performed by an electronic device (e.g., the electronic device 200 of FIG. 2) or a processor (e.g., the processor 510 of FIG. 5). Hereinafter, for convenience, it is described that the operations disclosed in FIG. 25 are performed by the processor 510, although one skilled in the art will understand that the various operations may be performed by the electronic device 200 under control of the processor 510.

In an embodiment, in operation 3010, the processor 510 may display a virtual object at a first position of a screen in response to a first POV.

In an embodiment, in operation 3020, the processor 510 may maintain a display position of the virtual object to the first position of the screen in response to a second POV. In an embodiment, the second POV may be different from the first POV. For example, even if the POV changes from the first POV to the second POV, the processor 510 may maintain the display position of the virtual object to the first position of the screen.

In an embodiment, in operation 3030, the processor 510 may receive a user input for changing a display mode of the virtual object. In an embodiment, a user input for changing the display mode of the virtual object may correspond to a first user input disclosed in FIG. 1.

In an embodiment, in operation 3040, the processor 510 may display the virtual object at a second position of the screen in response to a third POV. In an embodiment, the third POV may be different from the second POV. The third POV may be different from or identical to the first POV. The second position may be different from the first position.

The computer-readable storage media may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), an internal memory, or the like. The instruction may include a code created by a compiler or a code executable by an interpreter. The module or programming module according to various embodiments may further include at least one or more elements among the aforementioned elements, or may omit some of them, or may further include additional other elements. According to various embodiments, operations performed by a module, programming module, or other elements may be executed in a sequential, parallel, repetitive, or heuristic manner. At least some of the operations may be executed in a different order or may be omitted, or other operations may be added.

While various example embodiments have been illustrated and described, it will be understood that the various example embodiments are intended to be illustrative, not limiting. One of ordinary skill in the art will understand that various changes in forms and details may be made without departing from the scope of the disclosure including the appended claims and their equivalents.

An electronic device according to various example embodiments of the disclosure opens limited modality so that a user can easily and intuitively access a virtual object interface (e.g., a virtual object image) displayed on a screen, and can search a virtual space capable of displaying a virtual object by expanding the virtual space.

What is claimed is:

1. An electronic device comprising:
a display;
a processor operatively coupled to the display;
a memory operatively coupled to the processor, wherein the memory is configured to store instructions which, when executed, are configured to cause the processor to control the electronic device to:
during a first display mode, display, on a screen of the display, at least one virtual object at a first position on the screen by superimposing the at least one virtual object on a real object in a field of view (FOV), wherein during the first display mode, a position of the real object in the FOV is to change based on changes of a Point Of View (POV) of a user and the first position of the at least one virtual object on the screen is fixed irrespective of changes in the POV of the user;
during the display of the at least one virtual object in the first display mode, receive a first input for changing the display mode of the at least one virtual object from the first display mode to a second display mode;
in response to receiving the first input to change to the second display mode, change a display mode to the second display mode;
during the second display mode, change a position of the at least one virtual object from the first position to a second position of the screen determined based on changes of the POV of the user after the first input, wherein during the second display mode, the position of the real object in the FOV is to change based on the changes of the POV of the user after the first input;
during the second display mode, receive a second input for selecting one virtual object from among the at least one virtual object displayed on the screen; and
in response to receiving the second input, simultaneously display the at least one virtual object using the first display mode and a plurality of second virtual objects using the second display mode, wherein the plurality of second virtual objects include information corresponding to identified points of interest in a real space in the FOV and are displayed at positions on the screen corresponding to positions of the corresponding identified points of interest on the screen.

2. The electronic device of claim 1, wherein the first input comprises at least one of an input for a user interface disposed on a surface of the electronic device, a gesture input for performing a designated motion, a voice input comprising a designated keyword, and a gaze input based on gazing a designated region of the screen for at least a designated time.

3. The electronic device of claim 1, wherein as at least part of an operation of displaying the at least one virtual object in the second display mode, the instructions, when executed, cause the processor to control the electronic device to:
determine a real space coordinate corresponding to the at least one virtual object;
map the determined real space coordinate to the at least one virtual object; and
display the at least one virtual object based on the determined real space coordinate.

4. The electronic device of claim 3, wherein as at least part of an operation of determining a real space coordinate corresponding to the at least one virtual object, the instructions, when executed, cause the processor to control the electronic device to determine a real space coordinate corresponding to the at least one virtual object using a first real space coordinate corresponding to a position of the user and a second real space coordinate corresponding to a position in a screen in which the at least one virtual object is previously displayed in the first display mode.

5. The electronic device of claim 4, wherein as at least part of an operation of determining a real space coordinate corresponding to the at least one virtual object using the first real space coordinate and the second real space coordinate, the instructions, when executed, cause the processor to control the electronic device to determine a real space coordinate corresponding to the at least one virtual object by internally dividing the first real space coordinate and the second real space coordinate by a designated ratio.

6. The electronic device of claim 5, wherein as at least part of an operation of displaying the at least one virtual object based on the determined real space coordinate, the instructions, when executed, cause the processor to control the electronic device to display a first screen and at least part of at least one second screen,
wherein the first screen comprises the at least one virtual object, and
wherein the at least one second screen is located within a designated distance from the first screen.

7. The electronic device of claim 6, wherein the instructions, when executed, cause the processor to control the electronic device to:
receive a third input for selecting any one virtual object from among at least one virtual object displayed on the screen; and
perform a function corresponding to the selected virtual object.

8. The electronic device of claim 7, wherein as at least part of an operation of receiving the third input, the instructions, when executed, cause the processor to control the electronic device to:
detect a head movement causing a change in the POV of the user; and
change a display position of the first screen and at least one second screen based on the detected head movement,
wherein a real space coordinate corresponding to the first screen and the at least one second screen does not change.

9. The electronic device of claim 7, wherein as at least part of an operation of receiving the third input, the instructions, when executed, cause the processor to control the electronic device to change the display position of the first screen and at least one second screen in response to detecting an input irrespective of the change in the POV of the user, wherein a real space coordinate corresponding to the first screen and the at least one second screen is configured to change depending on content of the input.

10. An electronic device comprising:
a display;
a processor operatively coupled to the display; and
a memory operatively coupled to the processor, wherein the memory is configured to store instructions which, when executed, cause the processor to control the electronic device to:
during a first display mode, display, on a screen of the display, at least one virtual object at a first position on the screen by superimposing the at least one virtual object on a real object in a field of view (FOV), wherein during the first display mode, a position of the real object in the FOV changes based on changes of a Point Of View (POV) of a user and the first position of the at least one virtual object on the screen is fixed irrespective of changes in the POV of the user;

during the display of the at least one virtual object in the first display mode, receive a first input for changing the display mode of the at least one virtual object from the first display mode to a second display mode;

in response to receiving the first input to change to the second display mode, change a display mode to the second display mode;

during the second display mode, change a position of the at least one virtual object from the first position to a second position of the screen determined based on changes of the POV of the user after the first input, wherein during the second display mode, the position of the real object in the FOV changes based on the changes of the POV of the user after the first input;

receive a second input for storing information related to the at least one virtual object in a form of one virtual object mapped to a specific real space coordinate;

store the information related to the at least one virtual object in a form of one virtual object mapped to the specific real space coordinate in response to receiving the second input;

during the second display mode, receive a third input for selecting one virtual object from among the at least one virtual object displayed on the screen; and in response to receiving the third input, simultaneously display the at least one virtual object using the second display mode and a plurality of second virtual objects using the first display mode, wherein the plurality of second virtual objects include information corresponding to identified points of interest in the real space in the FOV and are displayed at positions on the screen corresponding to positions of the corresponding identified points of interest on the screen.

11. A method of operating an electronic device, the method comprising:

during a first display mode, displaying, on a screen, at least one virtual object at a first position on the screen by superimposing the at least one virtual object on a real object in a field of view (FOV), wherein during the first display mode, a position of the real object in the FOV changes based on changes of a Point Of View (POV) of a user and the first position of the at least one virtual object on the screen is fixed irrespective of changes in the POV of the user;

during the display of the at least one virtual object in the first display mode, receiving a first input for changing the display mode of the at least one virtual object from the first display mode to a second display mode; and in response to receiving the first input to change to the second display mode, changing a display mode to the second display mode;

during the second display mode, changing a position of the at least one virtual object from the first position to a second position of the screen determined based on changes of the POV of the user after the first input, wherein during the second display mode, the position of the real object in the FOV changes based on the changes of the POV of the user after the first input;

during the second display mode, receiving a second input for selecting one virtual object from among the at least one virtual object displayed on the screen; and in response to receiving the second input, simultaneously displaying the at least one virtual object using the first display mode and a plurality of second virtual objects using the second display mode, wherein the plurality of second virtual objects include information corresponding to identified points of interest in a real space in the FOV and are displayed at positions on the screen corresponding to positions of the corresponding identified points of interest on the screen.

12. The method of claim 11, wherein the first input comprises at least one of an input for a user interface disposed on a surface of the electronic device, a gesture input for performing a designated motion, a voice input comprising a designated keyword, and a gaze input based on gazing a designated region of the screen for at least a designated time.

13. The method of claim 11, wherein the displaying of the at least one virtual object in the second display mode comprises:

determining a real space coordinate corresponding to the at least one virtual object;

mapping the determined real space coordinate to the at least one virtual object; and displaying the at least one virtual object based on the determined real space coordinate.

14. The method of claim 13, wherein the determining of the real space coordinate corresponding to the at least one virtual object comprises determining a real space coordinate corresponding to the at least one virtual object using a first real space coordinate corresponding to a position of the user and a second real space coordinate corresponding to a position in a screen in which the at least one virtual object is previously displayed in the first display mode.

15. The method of claim 14, wherein the determining of the real space coordinate corresponding to the at least one virtual object using the first real space coordinate and the second real space coordinate comprises determining a real space coordinate corresponding to the at least one virtual object by internally dividing the first real space coordinate and the second real space coordinate by a designated ratio.

16. The method of claim 15, wherein the displaying of the at least one virtual object based on the determined real space coordinate comprises displaying a first screen and at least part of at least one second screen, wherein the first screen comprises the at least one virtual object, and wherein the at least one second screen is located within a designated distance from the first screen.

17. The method of claim 16, further comprising:

receiving a third input for selecting any one virtual object from among at least one virtual object displayed on the screen; and performing a function corresponding to the selected virtual object.

18. The method of claim 17, wherein the receiving of the third input comprises:

detecting a head movement causing a change in the POV of the user; and changing a display position of the first screen and at least one second screen based on the detected head movement, wherein a real space coordinate corresponding to the first screen and the at least one second screen does not change.

19. The method of claim 17, wherein the receiving of the third input comprises changing the display position of the first screen and at least one second screen in response to detecting an input irrespective of the change in the POV of the user, wherein a real space coordinate corresponding to the first screen and the at least one second screen is configured to change depending on content of the input.

\* \* \* \* \*